United States Patent
Sun et al.

(10) Patent No.: US 12,324,028 B2
(45) Date of Patent: Jun. 3, 2025

(54) SYNCHRONIZATION SIGNAL BLOCK TO PHYSICAL RANDOM ACCESS CHANNEL MAPPING WITH MULTIPLE RESOURCE BLOCK SETS

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 17/406,048

(22) Filed: Aug. 18, 2021

(65) Prior Publication Data
US 2022/0061099 A1     Feb. 24, 2022

Related U.S. Application Data

(60) Provisional application No. 63/067,815, filed on Aug. 19, 2020.

(51) Int. Cl.
*H04W 74/08* (2024.01)
*H04W 72/04* (2023.01)
(Continued)

(52) U.S. Cl.
CPC ....... *H04W 74/0891* (2013.01); *H04W 72/04* (2013.01); *H04W 74/0833* (2013.01); *H04W 72/563* (2023.01)

(58) Field of Classification Search
CPC ............. H04W 74/0891; H04W 72/04; H04W 74/0833; H04W 72/563
See application file for complete search history.

(56) References Cited

U.S. PATENT DOCUMENTS 11,147,104 B2 * 10/2021 Zhang ................. H04J 11/0079
11,903,021 B2 *  2/2024 Sun ................... H04W 74/0833
(Continued)

FOREIGN PATENT DOCUMENTS

WO     2020175950 A1    9/2020
WO  WO-2022033577 A1 *  2/2022

OTHER PUBLICATIONS

3GPP TS 38.213 V16.2.0, 3rd Generation Partnership Project; Technical Specification Group Radio Access Network; NR; Physical layer procedures for control, (Jun. 2020).*

(Continued)

*Primary Examiner* — Michael J Moore, Jr.
(74) *Attorney, Agent, or Firm* — Procopio, Cory, Hargreaves & Savitch LLP

(57) ABSTRACT

A UE receives an SSB having an SSB index and transmits a random access message using a PRACH resource based on a mapping to a number (X) of preamble sequences that are allocated for SSBs first in a sequence domain within a RO, second in a frequency domain RO within the single RB set, third in a time domain RO within a PRACH slot, and fourth within a PRACH slot domain within a time period. of preamble sequences that are allocated for SSBs first in an order first based on a sequence domain within a RO, second in a frequency domain of the RO within a single RB set, third in a time domain of one or more ROs within a PRACH slot, and fourth within a PRACH slot domain that is within a time period.

30 Claims, 18 Drawing Sheets

(51) Int. Cl.
*H04W 74/0833* (2024.01)
*H04W 72/563* (2023.01)

(56) References Cited

U.S. PATENT DOCUMENTS

| | | | | |
|---|---|---|---|---|
| 12,052,770 | B2* | 7/2024 | Chai | H04L 5/0044 |
| 2019/0387546 | A1* | 12/2019 | Li | H04L 27/26132 |
| 2020/0128588 | A1* | 4/2020 | Xiong | H04B 7/0617 |
| 2020/0274682 | A1* | 8/2020 | Sun | H04J 11/0079 |
| 2020/0413444 | A1* | 12/2020 | Shi | H04W 74/02 |
| 2021/0058971 | A1* | 2/2021 | MolavianJazi | H04L 5/0044 |
| 2022/0061097 | A1* | 2/2022 | Kwak | H04W 24/08 |
| 2022/0061099 | A1* | 2/2022 | Sun | H04W 74/0833 |
| 2022/0070919 | A1* | 3/2022 | Sun | H04J 1/02 |
| 2022/0167436 | A1* | 5/2022 | Shin | H04L 5/0053 |
| 2022/0346158 | A1* | 10/2022 | Xu | H04W 56/0045 |
| 2024/0107588 | A1* | 3/2024 | Ugurlu | H04W 74/0833 |

OTHER PUBLICATIONS

3GPP TS 38.213 V16.2.0, 3rd Generation Partnership Project; Technical Specification Group Radio Access Network; NR; Physical layer procedures for control, (Jun. 2020). (Year: 2020).*

"3rd Generation Partnership Project, Technical Specification Group Radio Access Network, NR, Physical Layer Procedures for Control (Release 16)", Draft 38213-G20, 3rd Generation Partnership Project (3GPP), Mobile Competence Centre, 650, Route Des Lucioles, F-06921 Sophia-Antipolis Cedex, France, Jul. 15, 2020 (Jul. 15, 2020), 3GPP TS 38.213 V16.2.0 (Jun. 2020), 176 Pages, URL: https://ftp.3gpp.org/tsg_ran/WG1_RL1/DRAFT/Draft_versions/Draft38213-g20.zip, [retrieved on Jul. 15, 2020] p. 14, Line 24—p. 16, Line 13, Para. 7.1, Para. 7.7, Para. 7.7.1.

International Search Report and Written Opinion—PCT/US2021/046766—ISA/EPO—Dec. 22, 2021.

LG Electronics: "Discussion on Potential UE Complexity Reduction Features", 3GPP Draft, 3GPP TSG RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 7, 2020 (Aug. 7, 2020), XP051915288, 8 Pages, URL: https://ftp.3gpp.org/tsg_ran/WG1_RL1/TSGR1_102-e/Docs/R1-2006306.zip R1-2006306 Discussion on Potential UE Complexity Reduction Features.docx [retrieved on Aug. 7, 2020] p. 5.

* cited by examiner

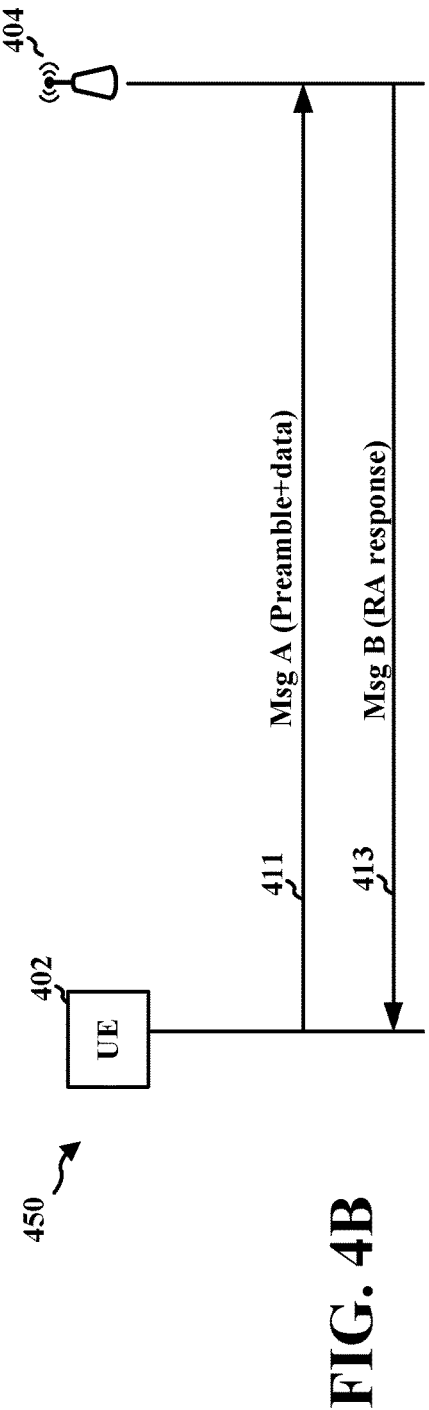
FIG. 4A
FIG. 4B

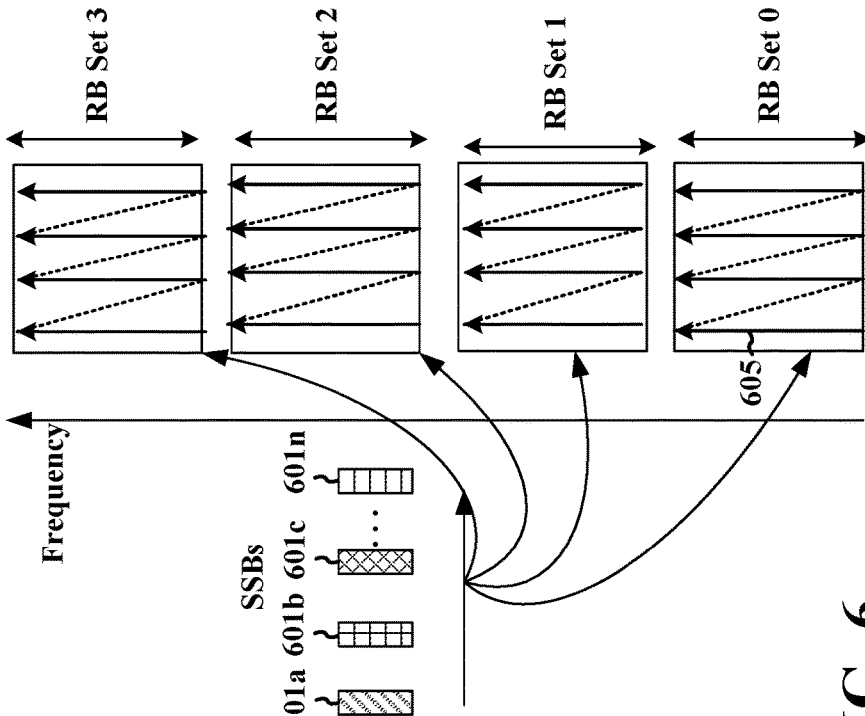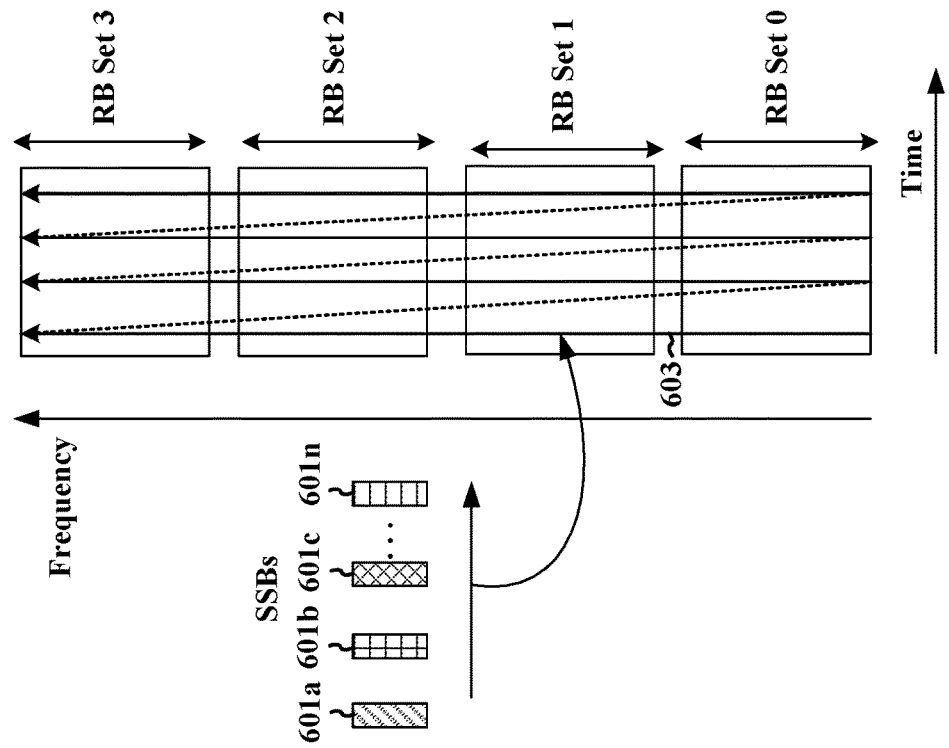
FIG. 6

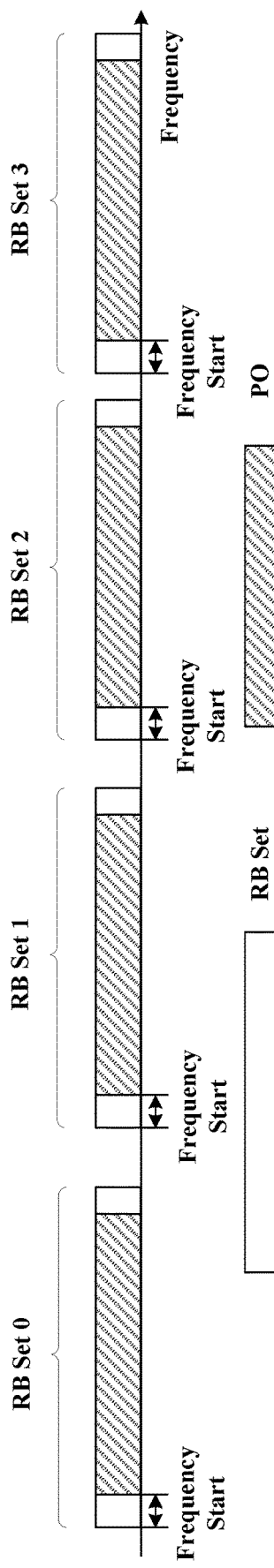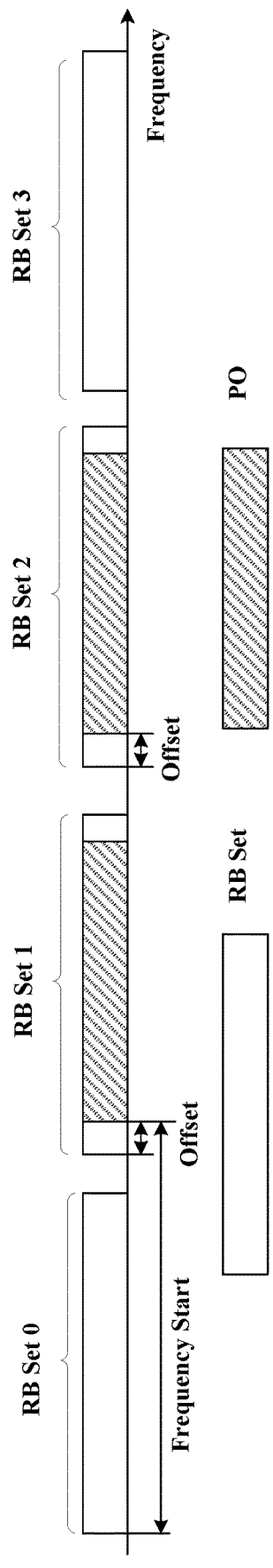
FIG. 10A
FIG. 10B

SYNCHRONIZATION SIGNAL BLOCK TO PHYSICAL RANDOM ACCESS CHANNEL MAPPING WITH MULTIPLE RESOURCE BLOCK SETS

CROSS REFERENCE TO RELATED APPLICATION(S)

This application claims the benefit of and priority to U.S. Provisional Application Ser. No. 63/067,815, entitled "Synchronization Signal Block to Physical Random Access Channel Mapping with Multiple Resource Block Sets" and filed on Aug. 19, 2020, which is expressly incorporated by reference herein in its entirety.

TECHNICAL FIELD

The present disclosure relates generally to communication systems, and more particularly, to wireless communication including random access.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may use a random access procedure in order to communicate with a base station. For example, the UE may use the random access procedure to request a radio resource control (RRC) connection, to re-establish an RRC connection, resume an RRC connection, etc. The UE and base station may communicate using directional beams. The base station may transmit a synchronization signal block (SSB) over different beam directions, and the UE may select a beam on which the SSB was received with a strongest signal to perform random access with the base station. A random access resource, e.g., a time, frequency and/or preamble resource, may be mapped to each beam. The UE may use the random access resource associated with the selected beam to transmit or receive a random access message. An association between the beam and the random access resources may be based on a mapping between an SSB index and physical random access channel (PRACH) occasions. The mapping may be based on an association pattern between PRACH resources and the SSB indexes applied for a period of time.

For unlicensed communication, initial access bandwidth may span a single resource block (RB) set, and the physical random access channel (PRACH) resources for initial access may map to the single RB set. For a connected mode UE, the PRACH configuration may include multiple RB sets, e.g., corresponding to a wider uplink bandwidth part (BWP). The use of multiple RB sets may help to spread random access communication from various UEs across a wider frequency range and may help to avoid collisions among UEs. Having multiple random access occasions (ROs) in the frequency domain in different RB sets may help to distribute the PRACH loading and provide listen before talk (LBT) diversity. However, the SSB to PRACH mapping with different numbers of frequency domain random access occasions (ROs) for initial access and connected mode access may lead to a different mappings between SSB indexes and PRACH resources. With a different mapping, a PRACH sequence that is received by a base station may map to two different SSBs depending on the UE configuration (e.g., initial access or a connected mode UE) and may differ based on the number of RB sets. Aspects presented herein provide for more clarity in PRACH communication and avoids mapping differences between initial access and a connected mode through applying the SSB-to-PRACH mapping to a frequency domain within a single RB set and repeating the mapping for the additional RB sets.

In an aspect of the disclosure, a method, a computer-readable medium, and an apparatus are provided for wireless communication at a UE. The UE receives a SSB having an SSB index and transmits a random access message using a PRACH resource based on an association pattern period for a single RB set of one or more RB sets, the SSB being mapped to a number (X) of preamble sequences that are allocated for SSBs first in an order first based on a sequence domain within a RO, second in a frequency domain of the RO within a single RB set, third in a time domain of one or more ROs within a PRACH slot, and fourth within a PRACH slot domain that is within a time period.

In another aspect of the disclosure, a method, a computer-readable medium, and an apparatus are provided for wireless communication at a base station. The base station transmits an SSB over each of a plurality of beams, the SSB on each beam having a corresponding SSB index. The base station configures multiple RB sets for a PRACH. The base station receives a random access message, from a UE associated with an SSB index, the PRACH resources of the random access message based on an association pattern period, where one SSB is mapped to a number (X) of preamble sequences that are allocated for SSBs first in an order first based on a sequence domain within a RO, second in a frequency domain of the RO within a single RB set, third in a time domain of one or more ROs within a PRACH slot, and fourth within a PRACH slot domain that is within a time period.

In another aspect of the disclosure, a method, a computer-readable medium, and an apparatus are provided for wireless communication at a UE. The UE determines an SSB index and determines multiple configured RB sets for a PRACH. The UE determines a PRACH resource within an association pattern period, for each RB set where one SSB is mapped to a number (X) preamble sequences and the preamble sequence are allocated for SSBs first in a sequence domain within a RO, second in a frequency domain RO within an RB set, third in a time domain RO within a PRACH slot, and fourth within a PRACH slot domain within a time period. The UE transmits a random access message using the determined PRACH resource.

In another aspect of the disclosure, a method, a computer-readable medium, and an apparatus are provided for wireless communication. The apparatus determines multiple configured RB sets for a PRACH and Msg A PUSCH. The apparatus determines a PRACH resource for a Msg A PRACH and a Msg A PUSCH, wherein for each PRACH slot, a number (N) of preambles are mapped to a valid PUSCH occasion with a DMRS sequence, where the N PRACH sequences are counted first in a sequence domain in a RO, second in a frequency domain RO within an RB set, and third in a time domain within a PRACH slot, and where the valid PUSCH occasion and an associated DMRS sequence is mapped first in a frequency domain PO within an RB set, second to a DMRS sequence, third in a time domain PO within a slot, and fourth in the time domain PO over multiple slots.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A illustrates an example of a 4-step random access procedure.

FIG. 4B illustrates an example of a 2-step random access procedure.

FIG. 6 illustrates examples of SSB to PRACH resource mapping for multiple RB sets.

FIGS. 10A and 10B illustrate frequency offsets for POs in multiple RB sets.

DETAILED DESCRIPTION

Figure 1:
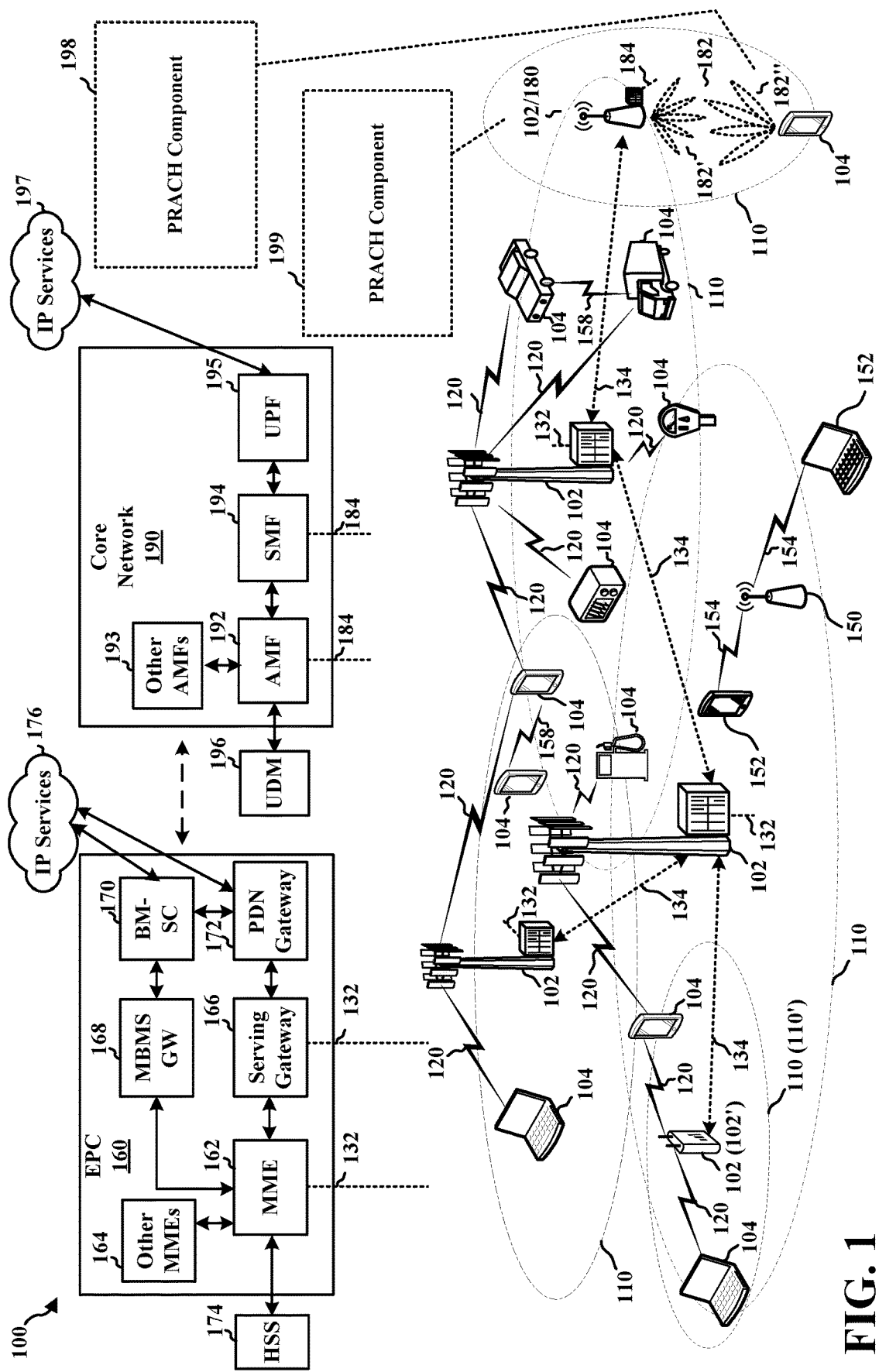
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may receive an SSB associated with an SSB index. The UE 104 may include a PRACH component 198 configured to transmit a random access message using a PRACH resource based on an association pattern period for a single RB set of one or more RB sets, the SSB being mapped to a number X of preamble sequences that are allocated for SSBs first in a sequence domain within a RO, second in a frequency domain RO within the single RB set, third in a time domain RO within a PRACH slot, and fourth within a PRACH slot domain within a time period. In some aspects, the PRACH component 198 may be configured to determine an SSB index, determine multiple configured RB sets for a PRACH, and determine a PRACH resource within an association pattern period, for each RB set where one SSB is mapped to a number X preamble sequences and the preamble sequence are allocated for SSBs first in a sequence domain within a RO, second in a frequency domain RO within an RB set, third in a time domain RO within a PRACH slot, and fourth within a PRACH slot domain within a time period. The UE 104 transmits a random access message using the determined PRACH resource. The PRACH component 198 may be configured to determine multiple configured RB sets for a PRACH and Msg A PUSCH and determine a PRACH resource for a Msg A PRACH and a Msg A PUSCH, where for each PRACH slot, a number N of preambles are mapped to a valid PUSCH occasion with a DMRS sequence, where the N PRACH sequences are counted first in a sequence domain in a RO, second in a frequency domain RO within an RB set, and third in a time domain within a PRACH slot, and where the valid PUSCH occasion and an associated DMRS sequence is mapped first in a frequency domain PO within an RB set, second to a DMRS sequence, third in a time domain PO within a slot, and fourth in the time domain PO over multiple slots.

The base station 102 or 180 may include a PRACH component 199 that is configured to monitor for PRACH transmissions from a UE based on a similar mapping to the aspects described in connection with the PRACH component 198. For example, the base station 102 or 180 may transmit an SSB over each of a plurality of beams, the SSB on each beam having a corresponding SSB index. The base station 102 or 180 may configure multiple RB sets for a PRACH. The PRACH component 199 may be configured to receive a random access message, from a UE associated with an SSB index, the PRACH resources of the random access message based on an association pattern period, where one SSB is mapped to a number X preamble sequences and the preamble sequence are allocated for SSBs first in a sequence domain within a RO, second in a frequency domain RO within a single RB set, third in a time domain RO within a PRACH slot, and fourth within a PRACH slot domain within a time period.

Figure 2:
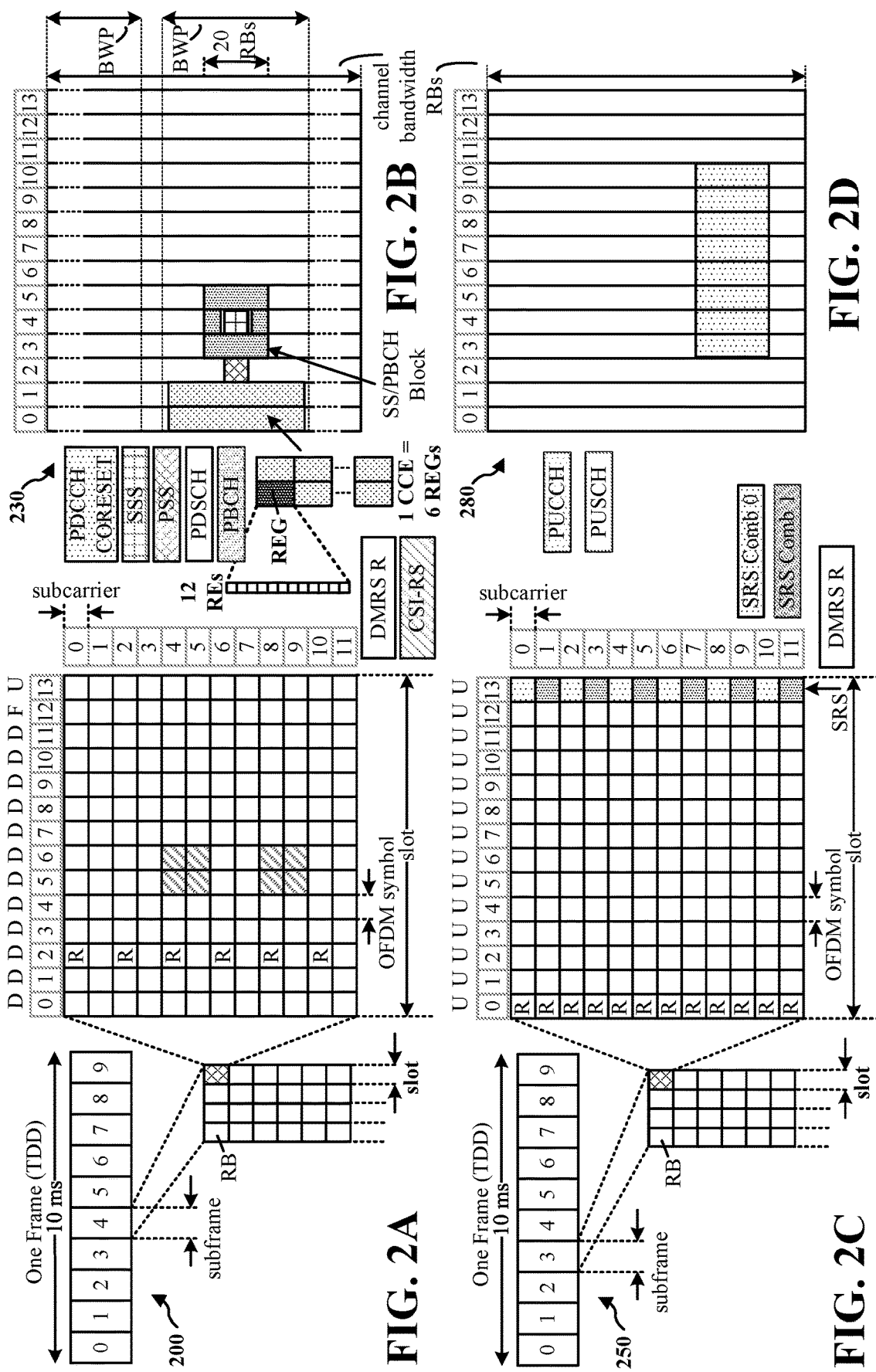
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The description applies also to a 5G NR frame structure that is TDD.

FIGS. 2A-2D illustrate a frame structure, and the aspects of the present disclosure may be applicable to other wireless communication technologies may have different frame structures and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on the cyclic prefix (CP) is normal or extended. For normal CP, each slot may include 14 symbols, and for extended CP, each slot may include 12 symbols. The symbols on DL may be CP orthogonal frequency division multiplexing ((OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and CP. The numerology defines the subcarrier spacing (SCS) and, effectively, the symbol length/duration, which is equal to 1/SCS.

| μ | SCS Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (e.g., 14 symbols per slot), different numerologies μ 0 to 4 allow for 1, 2, 4, 8, and 16 slots, respectively, per subframe. For extended CP, the numerology 2 allows for 4 slots per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μt=0 has a subcarrier spacing of 15 kHz and the numerology μt=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
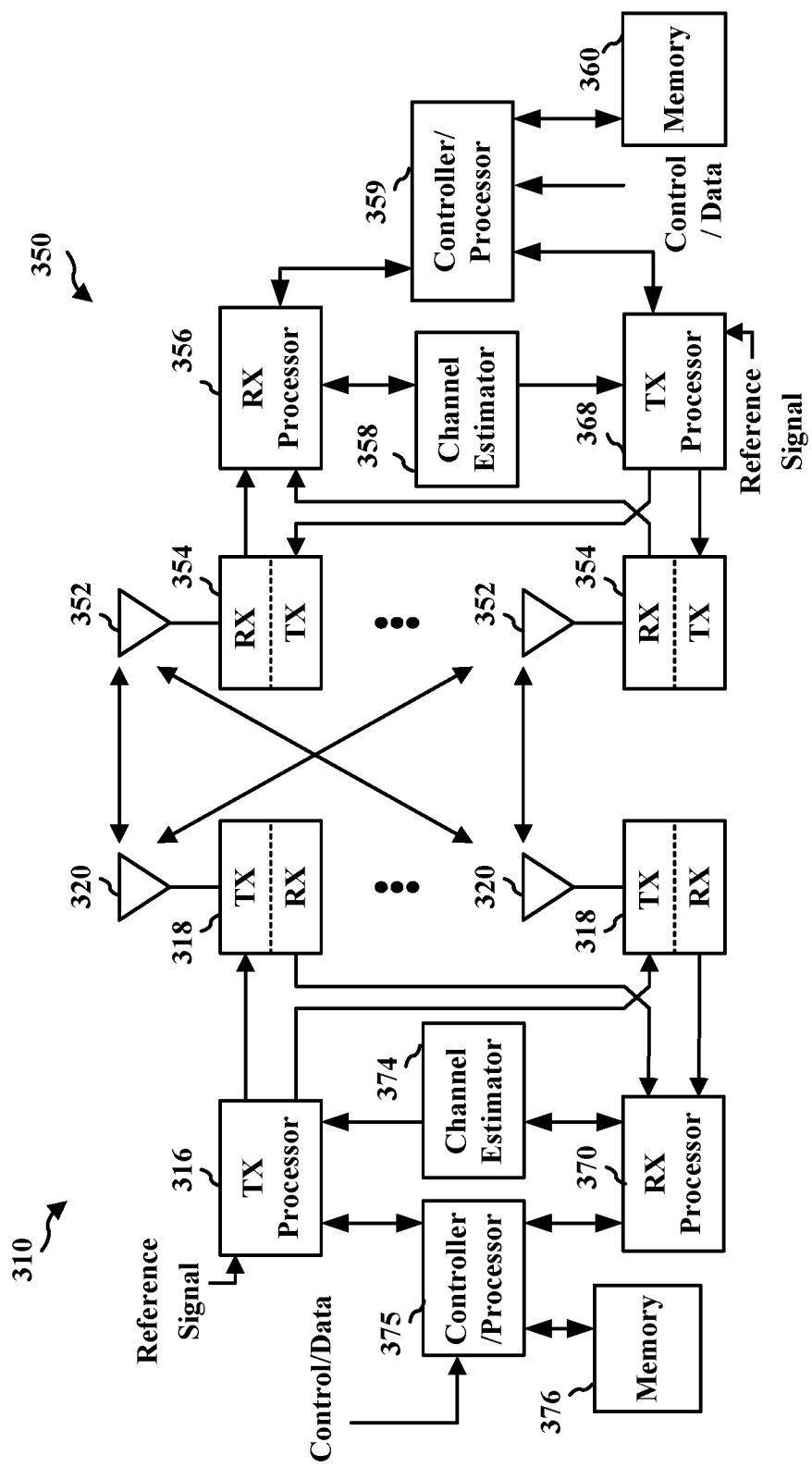
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PRACH component 198 of FIG. 1.

At least one of the TX processor 316, the RX processor 370, and the controller/processor 375 may be configured to perform aspects in connection with the PRACH component 199 of FIG. 1.

A UE may use a random access procedure in order to communicate with a base station. For example, the UE may use the random access procedure to request an RRC connection, to re-establish an RRC connection, resume an RRC connection, etc. FIGS. 4A and 4B illustrates example aspects of a random access procedure 400 between a UE 402 and a base station 404. The UE 402 may initiate the random access message exchange by sending, to the base station 404, a first random access message 403 (e.g., Msg 1) including a preamble. Prior to sending the first random access message 403, the UE may obtain random access parameters, e.g., including preamble format parameters, time and frequency resources, parameters for determining root sequences and/or cyclic shifts for a random access preamble, etc., e.g., in system information 401 from the base station 404. The preamble may be transmitted with an identifier, such as a Random Access RNTI (RA-RNTI). The UE 402 may randomly select a random access preamble sequence, e.g., from a set of preamble sequences. If the UE 402 randomly selects the preamble sequence, the base station 404 may receive another preamble from a different UE at the same time. In some examples, a preamble sequence may be assigned to the UE 402.

The base station responds to the first random access message 403 by sending a second random access message 405 (e.g. Msg 2) using PDSCH and including a random access response (RAR). The RAR may include, e.g., an identifier of the random access preamble sent by the UE, a time advance (TA), an uplink grant for the UE to transmit data, cell radio network temporary identifier (C-RNTI) or other identifier, and/or a back-off indicator. Upon receiving the RAR (e.g., Msg 2 405), the UE 402 may transmit a third random access message 407 (e.g., Msg 3) to the base station 404, e.g., using PUSCH, that may include a RRC connection request, an RRC connection re-establishment request, or an RRC connection resume request, depending on the trigger for the initiating the random access procedure. The base station 404 may then complete the random access procedure by sending a fourth random access message 409 (e.g., Msg 4) to the UE 402, e.g., using PDCCH for scheduling and PDSCH for the message. The fourth random access message 409 may include a random access response message that includes timing advancement information, contention resolution information, and/or RRC connection setup information. The UE 402 may monitor for PDCCH, e.g., with the C-RNTI. If the PDCCH is successfully decoded, the UE 402 may also decode PDSCH. The UE 402 may send HARQ feedback for any data carried in the fourth random access message. If two UEs sent a same preamble at 703, both UEs may receive the RAR leading both UEs to send a third random access message 407. The base station 404 may resolve such a collision by being able to decode the third random access message from only one of the UEs and responding with a fourth random access message to that UE. The other UE, which did not receive the fourth random access message 409, may determine that random access did not succeed and may re-attempt random access. Thus, the fourth message may be referred to as a contention resolution message. The fourth random access message 409 may complete the random access procedure. Thus, the UE 402 may then transmit uplink communication and/or receive downlink communication with the base station 404 based on the RAR and fourth random access message 409.

In order to reduce latency or control signaling overhead, a single round trip cycle between the UE and the base station may be achieved in a 2-step RACH process 450, such as shown in FIG. 4B. Aspects of Msg 1 and Msg 3 may be combined in a single message, e.g., which may be referred to as Msg A. The Msg A may include a random access preamble, and may also include a PUSCH transmission, e.g., such as data. The Msg A preambles may be separate from the four step preambles, yet may be transmitted in the same random access occasions (ROs) as the preambles of the four step RACH procedure or may be transmitted in separate ROs. An RO includes time and frequency resources in which the UE can transmit a PRACH. The PUSCH transmissions may be transmitted in PUSCH occasions (POs) that may span multiple symbols and PRBs. A PO includes time and frequency resources in which the UE can transmit a PUSCH. After the UE 402 transmits the Msg A 411, the UE 402 may wait for a response from the base station 404. Additionally, aspects of the Msg 2 and Msg 4 may be combined into a single message, which may be referred to as Msg B. Two step RACH may be triggered for reasons similar to a four-step RACH procedure. If the UE does not receive a response, the UE may retransmit the Msg A or may fall back to a four-step RACH procedure starting with a Msg 1. If the base station detects the Msg A, but fails to successfully decode the Msg A PUSCH, the base station may respond with an allocation of resources for an uplink retransmission of the PUSCH. The UE may fall back to the four step RACH with a transmission of Msg 3 based on the response from the base station and may retransmit the PUSCH from Msg A. If the base station successfully decodes the Msg A and corresponding PUSCH, the base station may reply with an indication of the successful receipt, e.g., as a random access response 413 that completes the two-step RACH procedure. The Msg B may include the random access response and a contention-resolution message. The contention resolution message may be sent after the base station successfully decodes the PUSCH transmission.

Figure 5:
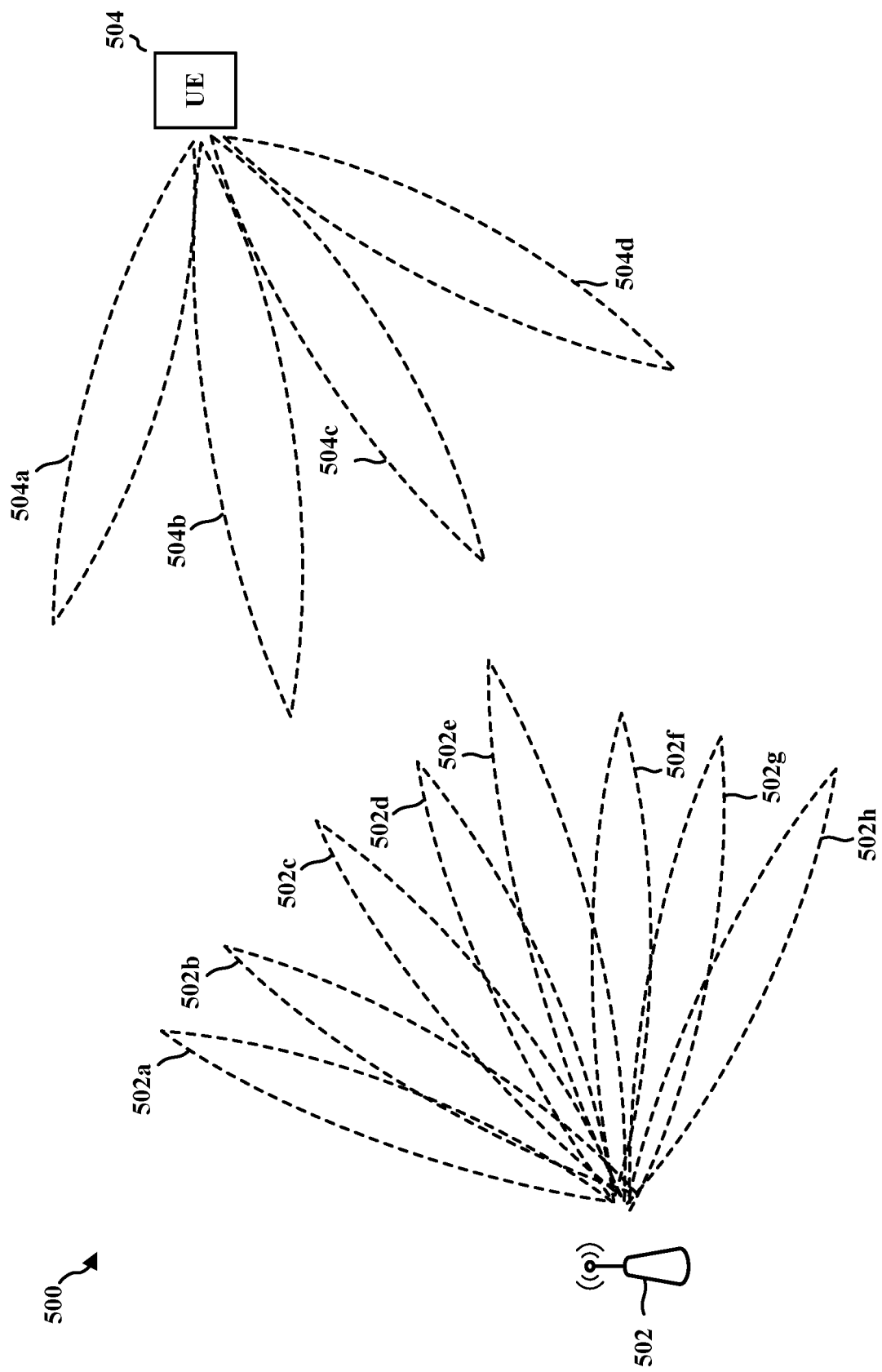
FIG. 5 illustrates an example of beamformed wireless communication between a base station and a UE.

FIG. 5 is a diagram 500 illustrating a base station 502 in communication with a UE 504. Referring to FIG. 5, the base station 502 may transmit a beamformed signal to the UE 504 in one or more of the directions 502*a*, 502*b*, 502*c*, 502*d*, 502*e*, 502*f*, 502*g*, 502*h*. The UE 504 may receive the beamformed signal from the base station 502 in one or more receive directions 504*a*, 504*b*, 504*c*, 504*d*. The UE 504 may also transmit a beamformed signal to the base station 502 in one or more of the directions 504*a*-504*d*. The base station 502 may receive the beamformed signal from the UE 504 in one or more of the receive directions 502*a*-502*h*. The base station 502/UE 504 may perform beam training to determine the best receive and transmit directions for each of the base station 502/UE 504. The transmit and receive directions for the base station 502 may or may not be the same. The transmit and receive directions for the UE 504 may or may not be the same.

In some examples, the base station may transmit an SSB over the different beam directions, e.g., 502*a*-502*h*, and each SSB may have an associated SSB index. Example aspects of an SSB are described in connection with FIG. 2B. The UE 402 detects the SSB in one or more directions in which the SSB was transmitted. The UE may select a beam on which the SSB was received with a strongest signal to perform random access with the base station 502. The UE may transmit a preamble, and the other random access messages, such as described in connection with FIG. 4A or 4B. A specific random access resource, e.g., a time, frequency, and/or preamble resource may be mapped to each beam. The UE may use the random access resource associated with the selected beam to transmit one or more of the random access messages. The use of the particular random access resource may indicate to the base station 502 the beam selected by the UE 504, for example.

The association between the beam and the random access resources may be provided through a mapping between SS/PBCH block (which may be referred to herein as an SSB) index and PRACH occasions. The SSB index may be provided, e.g., by a parameter such as an SSB position in a burst that may be provided in system information (e.g., "ssb-PositionsInBurst in SIB1") or in a common serving cell configuration (e.g., "ServingCellConfigCommon"). The mapping may be performed in an association pattern between the PRACH resources and the SSB indexes for a period of time. As an example, the time for the association pattern may be up to 160 ms. One SSB index may be mapped to one or more preamble sequences, for example. As an example, one SSB may be mapped to X preamble sequences, X being an integer number, and the preamble sequences may be allocated to SSBs:

1$^{st}$: in the sequence domain within an RO
2$^{nd}$: in the Frequency domain RO
3$^{rd}$: in the time domain RO within a PRACH slot
4$^{th}$: in the PRACH slot domain within a period For unlicensed communication, such as NR unlicensed (NR-U) in an unlicensed frequency spectrum, an RB set may be about 20 MHz and may be the listen-before-talk (LBT) unit. For initial access, the uplink (UL) bandwidth part (BWP) may be 20 MHz, e.g., corresponding to a single RB set. Thus, the PRACH resources for initial access may be mapped based on a single RB set. For PRACH for initial access, the PRACH may be constrained by the initial uplink BWP.

For a connected mode UE, the PRACH configuration may include multiple RB sets, such as when the active UL BWP is wider than 20 MHz. The use of multiple RBs may help to spread the random access from connected mode UEs across a wider frequency range and may help to avoid collisions among UEs. From efficient resource utilization point of view, the PRACH resource may be for a connected mode UE (to include multiple RB sets) as a super set of the PRACH resource for an idle UE. For example, for initial access, the UE may use PRACH in RB set 0 and in a connected mode, the UE may use PRACH in RB set 0/1/2/3 (e.g., a superset including RB set 0 and additional RB sets).

The multiple ROs in the frequency domain in different RB sets may help to distribute the PRACH loading and provide LBT diversity. For example, if a UE fails LBT in RB set 0 and passes LBT in RB set 1, the UE may send PRACH in RB set 1.

However, the SSB to PRACH mapping with different numbers of frequency domain ROs for initial access and connected mode access may lead to a different mapping between SSB indexes and PRACH resources. With a different mapping, a PRACH sequence that is received by a base station may map to two different SSBs depending on the UE configuration (e.g., initial access or a connected mode UE) and may differ based on the number of RB sets. FIG. 6 illustrates an example 600 that shows a mapping of SSB indexes to the multiple RB sets. As shown by the arrow 603, the SSB indexes 601a, 601b, 601c, up to 601n (e.g., for an example having n SSB indexes) are mapped in order to the frequency resources across the group of RB sets, e.g., including spanning RB set 0, RB set 1, RB set 2, and RB set 3. For example, the SSB indexes are mapped to fill the frequency domain resources of RB set 0 during a first RO in the time domain. When the frequency domain resources for the slot have been mapped, the mapping proceeds to map the frequency domain resources for the slot in RB set 1, and continues until the frequency domain resources for RB sets 0-3 are mapped for the particular RO. Then, the mapping the allocates, or maps, the SSB indexes to the frequency domain resources of RB set 0 for a second RO. The mapping continues to the frequency domain resources of RB set 1, RB set 2, and RB set 3 for the second RO. The mapping continues, e.g., across the RB sets, over the time domain resources, e.g., over the ROs within a PRACH slot. The mapping in 600 may lead to a different mapping between PRACH resources and SSB indexes based on the number of RB sets involved in the mapping. For example, if SSB index 601a, 601b, and 601c map within the RB set 0 for a first RO, but SSB index 601n maps in RB set 2, the mapping across multiple RB sets will be different than a mapping within a single RB set. As noted above, initial access may be performed based on a single RB set. In the single RB set example, SSB index n would be mapped to a second RO in RB set 0 in contrast to being mapped to RB set 1 in the first RO.

In order to avoid the difference in mapping between a single RB set and multiple RB sets, or between different numbers of RB sets, the SSB-to-PRACH mapping may map to frequency domain resources within one RB set, e.g., limited to a single RB set over the time resources being mapped. FIG. 6 illustrates an example 650 of the mapping within the frequency domain resources of a single RB set. As shown by the arrow 605, the mapping of the SSB indexes 601a-601n is applied within RB set 0 rather than across the span of RB sets 0-3 as illustrated by the arrow 603 in the example 600. For example, the SSB indexes are mapped to fill the frequency domain resources of RB set 0 during a first RO. When the frequency domain resources of the RB set 0 for the RO have been mapped, the mapping proceeds to map the frequency domain resources of the RB set 0 for a second RO. When the frequency domain resources of the RB set 0 for the second slot are mapped to the SSB indexes, the mapping proceeds to the frequency domain resources of RB set 0 for a third RO, and so forth. Similarly, the SSB indexes are separately mapped to fill the frequency domain resources of RB set 1 during a first RO. When the frequency domain resources of the RB set 1 for the RO have been mapped, the mapping proceeds to map the frequency domain resources of the RB set 1 for a second RO, and so forth over the time domain resources for the mapping. As an example, if the SSB indexes 601a, 601b, and 601c map within the RB set 0 for a first RO, but SSB index 601n does not, the SSB index 601n is mapped to RB set 0 in a second RO. By mapping the SSB indexes individually within the RB sets, the SSB index to PRACH resource will be consistent across a single RB set or multiple RB sets, which enables a base station to accurately determine the SSB index corresponding to a PRACH transmission from a UE.

Figure 7:
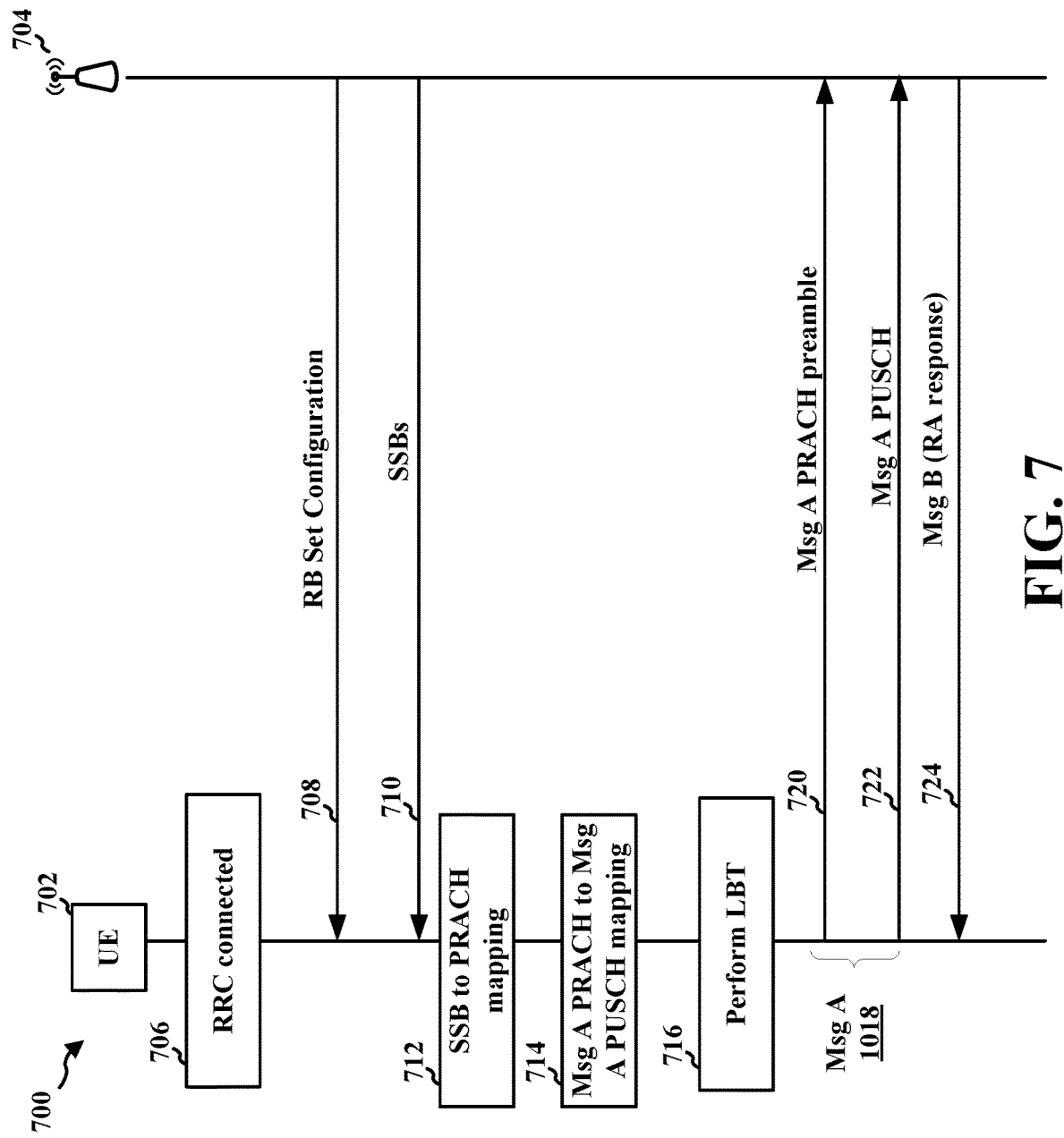
FIG. 7 illustrates a communication flow between a UE and a base station including a PRACH transmission.

FIG. 7 illustrates an example communication flow 700 between a UE 702 and a base station 704 that includes SSB-to-PRACH mapping within an RB set, e.g., as described in connection with the example 650 in FIG. 6 and/or the aspects described in connection with any of FIGS. 8-10. The UE 702 may be in an RRC connected mode, e.g., at 706. The UE 702 may communicate with the base station 704 on an unlicensed spectrum. In some aspects, the UE 702 may communicate with the base station based on NR-U. At 708, the UE 702 receives a configuration of multiple RB sets for random access. At 710, the UE receives one or more SSBs. As illustrated at 712, the UE may determine an SSB-to-PRACH mapping within a single RB set of the multiple RB sets. The base station may perform a corresponding mapping in order to receive a PRACH from the UE 702.

In some aspects, the mapping, at 712, may continue to map the SSB indexes to PRACH resources per RB set for multiple RB sets. For example, as shown in example 650 of FIG. 6, a mapping may be applied within individual RB sets, e.g., RB set 0, RB set 1, RB set 2, and RB set 3, rather than across a span of RB sets as in 600. For example, within the association pattern period, e.g., of one or more slots having one or more ROs, for each RB set, one SSB may be mapped to X preamble sequences with the X preamble sequences allocated to SSBs in the following order:
1$^{st}$: in the sequence domain within an RO
2$^{nd}$: in the frequency domain RO within the single RB set
3$^{rd}$: in the time domain RO within a PRACH slot
4$^{th}$: in the PRACH slot domain within a period As an example of the application of the order, the X preamble sequences are to the frequency domain resources within the single RB set for a first RO, and when the frequency resources of an individual RB set (e.g., RB set 0) during a RO are fully allocated, the mapping or allocation moves to the frequency domain resources of the individual RB set during second RO. There may be one or more ROs that occur within a PRACH slot domain. Once the preamble sequences are allocated to the frequency resources of the individual RB set (e.g., RB set 0) for each time domain RO in a PRACH slot, the mapping may proceed to allocate the preamble sequences in to the frequency domain resources of the individual RB set in the ROs of a second PRACH slot in a similar manner to the allocation in the first PRACH slot. When the allocation in the second PRACH slot is complete, the allocation may proceed to each PRACH slot within the association pattern period in the same manner. The association pattern period may span one or more PRACH slots.

In some aspects, the same procedure may then be applied for each RB set of the multiple RB sets configured for a connected mode UE to use for PRACH, with the mapping being performed per RB set, as shown in the example 650 in FIG. 6. FIG. 6 illustrates an example 650 that shows the mapping in the frequency domain RO within a single RB set, which is then repeated for the other RB sets. The mapping of PRACH resources to SSB index within a single RB set will provide a correspondence with the mapping used for initial access within the same RB set.

The UE 702 may transmit the PRACH, e.g., Msg A PRACH 720, to the base station 704 based on the mapping.

Multiple frequency domain ROs can be configured, e.g., 1/2/4/8 frequency domain ROs. For long sequence PRACH, e.g., for NR-U, one RO can be placed in one RB set (one RO may be close to 20 MHz, for example). In some aspects, the maximum may be 80 MHz or 100 MHz UL BWP, and it may be possible to include, e.g., 4 ROs in the frequency domain. One, two, or four frequency domain ROs may be applied in the active UL BWP. For a shorter sequence PRACH, e.g., for NR-U, a limit may be applied to not go beyond a particular number of frequency domain ROs. As an example, the number of frequency domain ROs may be 8 frequency domain ROs. The limitation may help to avoid errors in RA-RNTI computation, for example.

Figure 8A:
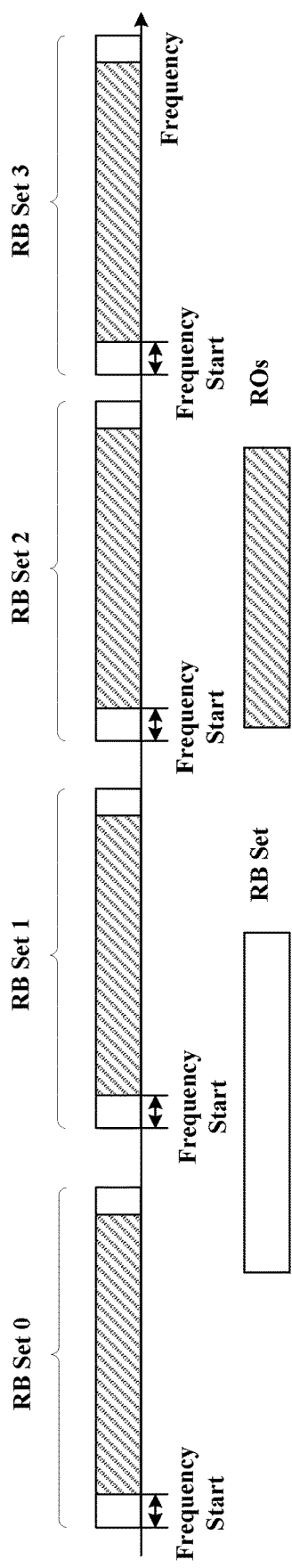
FIGS. 8A and 8B illustrate frequency offsets for ROs in multiple RB sets.

Aspects are presented herein for the placement of the PRACH in an RB set. For a longer sequence PRACH example, a msg1-FrequencyStart may be applied with respect to each RB set start. FIG. 8A illustrates an example with the frequency start offset applied to each RB set. However, for a shorter sequence PRACH, there may be no mechanism to indicate the particular RB set that will be used for PRACH (e.g., in case the PRACH is not on all configured RB sets).

Figure 8B:
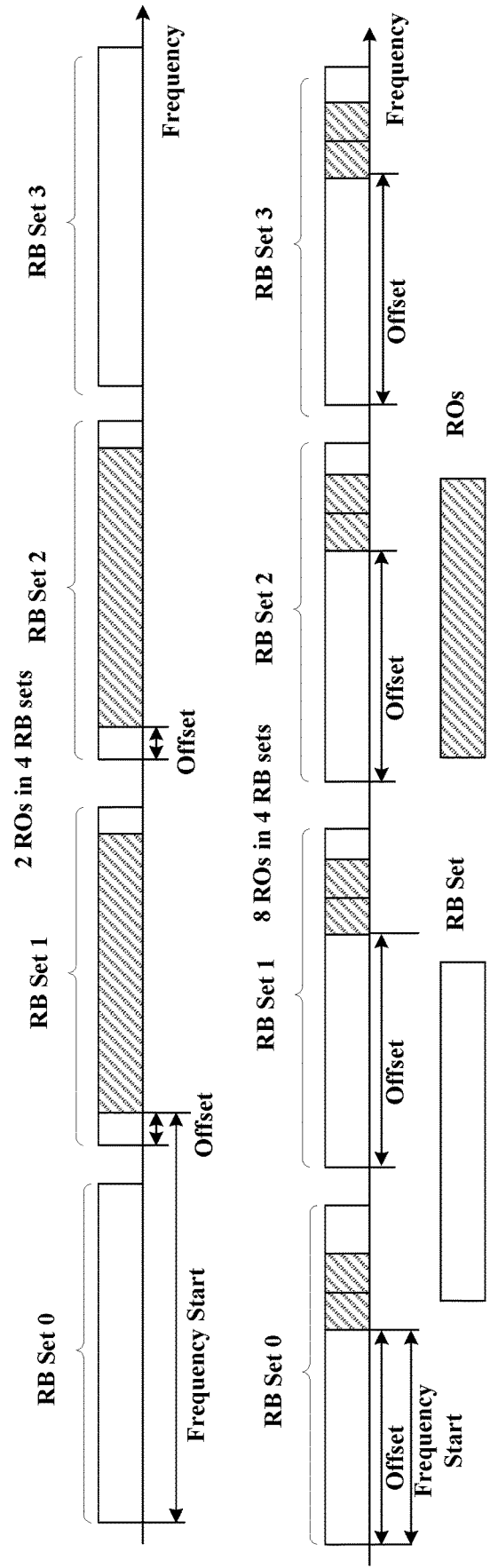

As presented herein, the frequency start offset may be applied differently than with respect to an RB set, as may be performed for the longer sequence PRACH. Instead, the PRACH placement may use the frequency start offset as the offset from the lowest RB of the lowest PRACH to PRB 0. An additional offset may be indicated between the PRACH starting point indicated by the frequency start and lower end of the RB set in which the first PRACH falls. The same offset may be applied to the next RB sets, e.g., if the first RB set cannot hold all of the configured frequency domain ROs. This example with the two offsets may be applied to both a short sequence (e.g., 139) and a long sequence (e.g., 571/1151) for PRACH, e.g., for NR-U. FIG. 8B illustrates an example of the two offsets being applied in an example of two ROs within two RBs sets and another example of the two offsets being applied in an example of 8 ROs in 4 RB sets.

As described in connection with FIG. 4B, the RACH may be based on a two-step RACH in which the Msg A includes a PRACH resource, e.g., for the Msg A PRACH 720, and a PUSCH resource, e.g., for the Msg A PUSCH 722. As illustrated at 714, the UE may map the Msg A PRACH resource to a Msg A PUSCH resource. The UE 702 may then transmit the Msg A PUSCH 722. The Msg A PRACH to Msg A PUSCH association may follow a frequency first mapping, e.g., as described in connection with the SSB-to-PRACH resource mapping. For each PRACH slot, N preambles may be mapped to a valid PUSCH occasion with a certain DMRS sequence. The N PRACH sequences be counted based on an order in which the sequences are first counted over a sequence domain in a RO. Then, the sequences are counted over the frequency domain resources of the RO. Once the sequences corresponding to the frequency domain resources of the RO are counted throughout the RO, the sequences are counted across the frequency domain resources of another time domain RO within a PRACH slot.

The valid PUSCH occasion and associated DMRS sequence may be mapped to the PRACH resources based on an order in which the PUSCH occasion and DMRS sequence are mapped first to the resources in the frequency domain during a PUSCH occasion (PO), second to the DMRS sequence resources, and when the frequency domain and DMRS resources in the PO are mapped, the mapping proceeds to map the frequency domain resources and DMRS sequence resources in a second PO. The mapping continues in this manner for each time PO over multiple slots of the association period. The association period refers to a period of time for applying the mapping or association between PRACH resources and PUSCH resources.

The same issue as described for the SSB-to-PRACH resource mapping example 600 may occur between PRACH to PUSCH resource mapping based on a single RB set configuration (e.g., for initial access) and a different PRACH to PUSCH resource mapping based on a multiple RB set configuration (e.g., for a connected mode UE). Thus, when a preamble is detected for a Msg A, the base station may not be aware of the particular PO being used by the UE and not correctly monitor for the Msg A PUSCH, because the PO may be different based on whether the UE mapped within a single RB set or within multiple RB sets. FIG. 9 illustrates an example 900 of a Msg A PRACH to Msg A PUSCH mapping across multiple RB sets. As shown at 903, the PRACH resources spanning each of RB sets 0-3 in a first period of time are mapped to the PUSCH resources spanning the RB sets 0-3 in a first PO, as shown at 905.

In order to avoid the ambiguity, the PRACH to PUSCH/DMRS mapping may be performed per RB set, such as described in connection with the SSB-to-PRACH mapping. FIG. 9 illustrates an example 950 that shows the mapping per RB set. In contrast to the mapping of resources that span the RB sets 0-3 in the example 900, the example 950 illustrates that the PRACH resources within a single RB set (e.g., RB set 0) during a first time period are mapped to the PUSCH resources in a corresponding RB set (e.g., RB set 0) in the PUSCH slots. As shown at 907 and 909, the mapping is first across the frequency domain of the individual RB set and then the time domain, e.g., of an RO within the PRACH slot and a PO within the PUSCH slot. The mapping is performed individually for each RB set, e.g., for RB set 0, RB set 1, RB set 2, and RB set 3 rather than a combined mapping that is performed across the frequency domain of the group of RB sets, as in the example 900. The PRACH to PUSCH/DMRS mapping may be applied in combination with the aspects of the SSB-to-PRACH mapping per RB set, e.g., as described in connection with the example 650 in FIG. 6.

For each PRACH slot, N preambles may be mapped to a valid PUSCH occasion with a certain DMRS sequence, with N being an integer number. The N PRACH sequences may be counted, or mapped, based on an order in which the PRACH sequences are mapped first to the sequence domain in an RO. The PRACH sequences are then mapped in the frequency domain of a single RB set during an RO and then in the time domain of the ROs within a PRACH slot.

The valid PUSCH occasion and associated DMRS sequence may be mapped to the PRACH resources based on an order in which the PUSCH resources are first mapped across a frequency domain during a PO within a single RB set, then to a DMRS sequence. After the frequency domain of the single RB set is mapped for the PO, the mapping continues to the frequency domain and DMRS sequence for a second PO within a slot. The mapping continues is this manner for each time domain PO over multiple slots of an association period. The association period may include one or more slots in which the PRACH to PUSCH mapping is to be applied.

Figure 9:
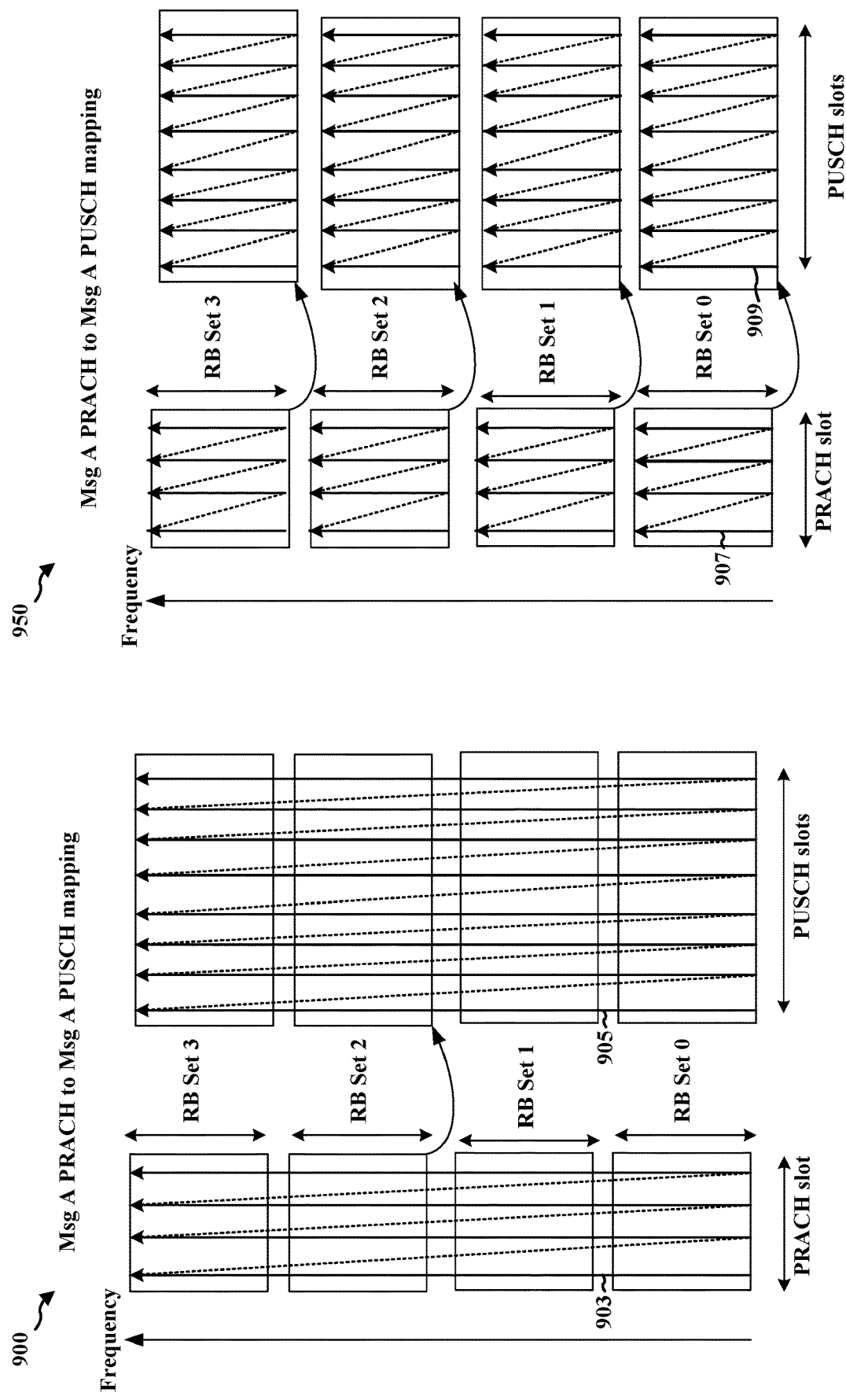
FIG. 9 illustrates examples of Msg A PRACH to Msg A PUSCH resources.

FIG. 9 illustrates an example 950 of a Msg A PRACH to Msg A PUSCH mapping within a single RB set. In some aspects, the mapping may be repeated for multiple RB sets. The same procedure may be applied for the mapping per RB set.

Similar to the PRACH configuration, the 2-step RACH Msg A PUSCH configuration may provide the offset from the lowest RB of first PUSCH to PRB 0 by an offset parameter such as a frequencyStartMsgA-PUSCH parameter when a non-interlaced waveform is used, or may provide the first interlace index when an interlaced waveform is used. For the non-interlaced version, the PUSCH occasion may be defined by a starting offset (from PRB 0), number of RBs for each PO, and guard band between POs (0 or 1 RB), and number of frequency domain POs (1/2/4/8). For the interlaced version, the PO may be defined by the starting interlace and number of interlaces. The configuration may not consider multiple RB sets and may apply only to a single RB set configuration.

Aspects presented herein provide resources for a Msg A PUSCH that is configured for multiple RB sets. When a non-interlaced PUSCH waveform is used, as a first option, the current frequency start for the PUSCH may be interpreted as a frequency start in each RB set. FIG. 10A illustrates an example of the application of the frequency offset in the first option to multiple RB sets. In a second option, a design may be used that includes two indications or offsets, e.g., similar to the determination of placement for the PRACH resource. For example, the offset may be identified between the PUSCH starting point indicated by the frequency start parameter and a lower end of the RB set in which the first PUSCH falls. Then, the same offset may be applied to the next RB sets, if the first RB set cannot hold all the frequency domain PUSCH occasions configured for the UE. FIG. 10B illustrates an example of the second option including the first offset and the second offset. Within each RB set, the integer number of POs may be filled in. Filling in may stop if the POs exceed the range of RB set.

If the interlaced PUSCH waveform is used, in a first option, another RRC parameter may indicate the starting RB set index. For example, the Msg A PUSCH may start from that RB set indicated by the starting RB set index. For example, for an RB set index of 1, the Msg A PUSCH occasion may be defined starting from RB set 1, and may continue in RB set 2, etc., if RB set 1 cannot hold all frequency domain POs. In a second option, a starting interlace index may indicate the starting interlace index over all of the RB sets, e.g., of multiple RB sets. For a 15/30 KHz waveform, there may be M=10/5 interlaces, respectively. The starting interlace may be in a range of 1-10 (e.g., 0-9) range. In order to indicate the starting interlace over multiple RB sets, the interlace index may be changed to a range of 0-39 or 49. The starting interlace of X may indicate a starting interlace starting from an RB set floor of X/M with an interlace of mod(X/M). For example, if X=11 and M=10, the indication starts from RB set 1 and interlace 1. In order to restrict the Msg A PUSCH in one RB set, a further restriction may be applied to filling POs if a PO exceeds the number of interlaces available in an RB set, and the placement may move to the next RB set.

At 716, the UE 702 may perform LBT, and if successful may proceed to transmit the Msg A 718. The Msg A may include a PRACH preamble (e.g., PRACH 1020), e.g., based on the SSB-to-PRACH mapping at 712. The Msg A 718 may include a Msg A PUSCH 722 based on the mapping at 714. As described in connection with FIG. 4B, the UE may receive a Msg B 724 from the base station 704 in response to the Msg A 718.

Figure 11:
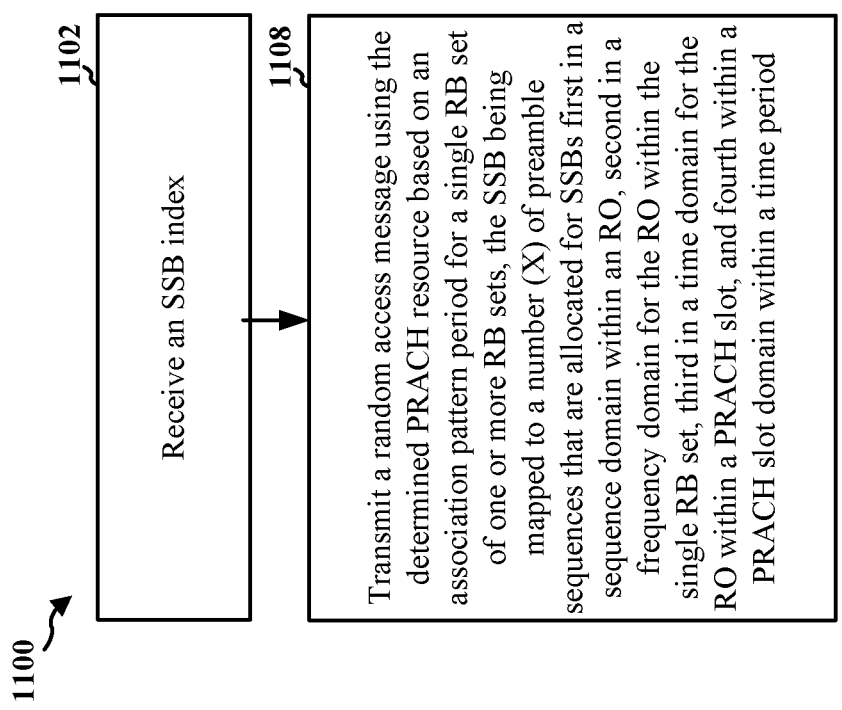
FIG. 11 is a flowchart of a method of wireless communication.

FIG. 11 is a flowchart 1100 of a method of wireless communication. The method may be performed by a UE (e.g., the UE 104, 350, 402, 504, 702). In some aspects, the method may be performed by an apparatus 1402 in FIG. 14, the apparatus having memory and at least one processor configured to perform one or more aspects of the method of FIG. 11.

At 1102, the UE receives an SSB having an SSB index. The reception may be performed, e.g., by the SSB component 1440 via the reception component 1430 of the apparatus 1402 in FIG. 14. Aspects of SSB reception are described in connection with FIG. 5. An example of a UE receiving an SSB is illustrated in FIG. 7.

At 1108, the UE transmits a random access message using the a PRACH resource based on an association pattern period for a single RB set of one or more RB sets, the SSB being mapped to a number (X) of preamble sequences that are allocated for SSBs in an order first based on a sequence domain within an RO, second in a frequency domain of the RO within the single RB set, third in a time domain of one or more ROs within a PRACH slot, and fourth within a PRACH slot domain that is within a time period. The transmission may be performed, e.g., by the PRACH component 1442 via the transmission component and/or the RF transceiver 1422 of the apparatus 1402. A placement of a PRACH transmission within the single RB set is based on a frequency start offset from a lowest resource element (RE) of the PRACH resources to a physical resource block 0 (PRB 0) and a second frequency offset between a PRACH starting point indicated by the frequency start and a lower end of the single RB set in which the PRACH transmission is positioned. The UE may be in a connected mode with a base station from which the SSB is received, and may transmit the PRACH transmission (e.g., the random access message) on a shared spectrum. Thus, the UE may perform an LBT prior to transmitting the PRACH. The single RB set may be one of multiple RB sets configured, by the base station from which the SSB is received, for transmission of the random access message on the PRACH.

The UE may further transmit a Msg A PUSCH mapped within the single RB set to the PRACH resource of the random access message. The transmission may be performed, e.g., by the PUSCH component 1444 via the transmission component and/or the RF transceiver 1422 of the apparatus 1402. The UE may map a PRACH resource for a Msg A PRACH and the Msg A PUSCH, wherein for each PRACH slot, a number (N) preambles are mapped to a valid PUSCH occasion with a DMRS sequence, where the N PRACH sequences are mapped based on a mapping order first in a sequence domain for a RO, second in a frequency domain for the RO within the single RB set, and third in a time domain within a PRACH slot. The UE may map a PO and an associated DMRS sequence to available PRACH resources, based on a mapping order that is first in a frequency domain of the PO within the single RB set, second to a DMRS sequence, third in a time domain of the PO within a slot, and fourth in the time domain of one or more POs over multiple slots. The UE may then transmit the DMRS associated with the Msg A PUSCH. The transmission may be performed, e.g., by the DMRS component 1446 via the transmission component and/or the RF transceiver 1422 of the apparatus 1402.

For a non-interlaced PUSCH, a frequency start offset from the lowest RB of a first PUSCH to a PRB 0 may be applied as a frequency start for the Msg A PUSCH in the single RB set. For a non-interlaced PUSCH, the UE may identify a first frequency offset between the first RB of the first PUSCH indicated by a frequency start offset and PRB 0, and identify a second frequency offset from the first RB of the first PUSCH and a lower end frequency resource of the RB set in which the first PUSCH is positioned. The UE may apply the second frequency offset to one or more additional (e.g., following) RB sets, if the first RB set does hold all of the configured frequency domain PUSCH occasions. Within each RB set, the UE may fill in an integer number of POs.

For an interlaced PUSCH, an RB set start offset may be applied from the lowest indexed RB set for the first PUSCH occasion which the Msg A PUSCH starts. For an interlaced PUSCH, a starting interlace index may be applied to a starting interlace index over a combined set of the multiple RB sets. The UE may further restrict the Msg A PUSCH to one RB set and may restrict mapping to POs if a particular PO exceeds a number of interlaces available in an RB set.

Figure 12:
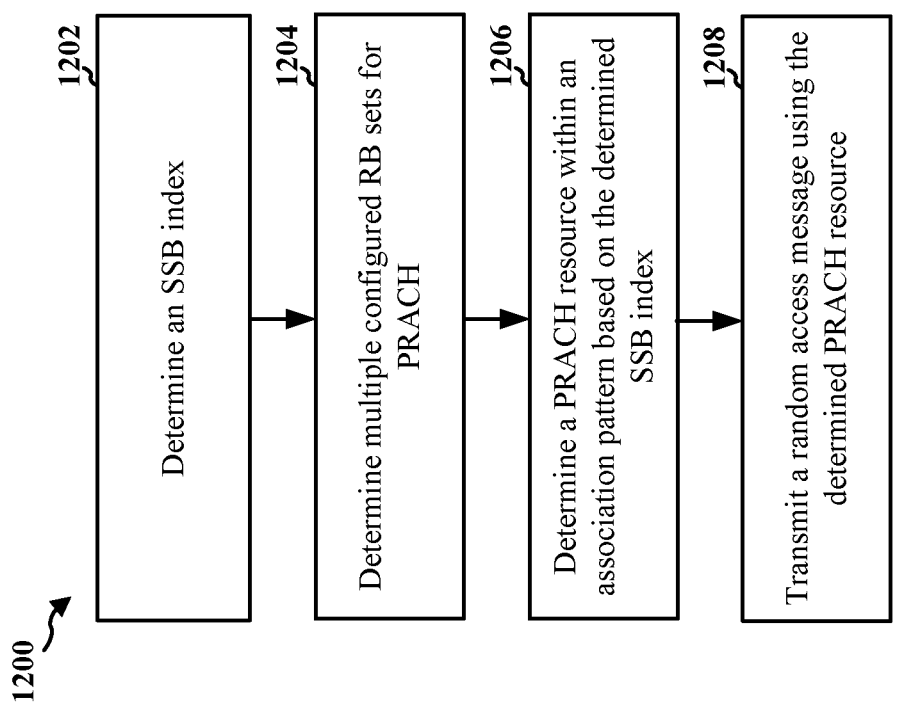
FIG. 12 is a flowchart of a method of wireless communication.

FIG. 12 is a flowchart 1200 of a method of wireless communication. The method may be performed by a UE (e.g., the UE 104, 350, 402, 504). In some aspects, the method may be performed by an apparatus 1402 in FIG. 14, the apparatus having memory and at least one processor configured to perform one or more aspects of the method of FIG. 12.

At 1202, the UE determines an SSB index. The SSB index may correspond to a beam on which the UE received a best SSB from the base station, such as described in connection with FIG. 5. The determination may be performed, e.g., by the SSB component 1440. FIG. 7 illustrates an example of a received SSB 710 that the UE 702 used to determine an SSB to PRACH resource mapping.

At 1204, the UE determines multiple configured RB sets for a PRACH. The determination may be performed, e.g., by the PRACH component 1442 of the apparatus 1402 in FIG. 14. FIG. 7 illustrates an example of a UE 702 receiving a configuration of one or more RB sets for PRACH, e.g., at 708.

At 1206, the UE determines a PRACH resource within an association pattern period, for each RB set where one SSB is mapped to a number (X) preamble sequences and the preamble sequence are allocated for SSBs first in a sequence domain within a RO, second in a frequency domain RO within an RB set, third in a time domain RO within a PRACH slot, and fourth within a PRACH slot domain within a time period. The mapping may include aspects described in connection with the example 650 in FIG. 6. A placement of a PRACH within an RB set is based on a frequency start offset from the lowest RE of the lowest PRACH to PRB 0 and a second frequency offset between the PRACH starting point indicated by the frequency start and a lower end of a first RB set in which the PRACH is positioned. For the first RB set with PRACH, the first offset is used, and in the later RB sets, the second offset is used (e.g., a frequency start from a first RB lowest RB). The determination may include any of the aspects described in connection with FIG. 7, such as at 712. The determination may be performed, e.g., by the PRACH component 1442 of the apparatus 1402 in FIG. 14.

At 1208, the UE transmits a random access message using the determined PRACH resource. The transmission may be performed, e.g., by the PRACH component 1442 of the apparatus 1402 in FIG. 14. FIG. 7 illustrates an example of a Msg A PRACH 720, to a base station 704 based on a mapping to the SSB, as described at 1206.

Figure 13:
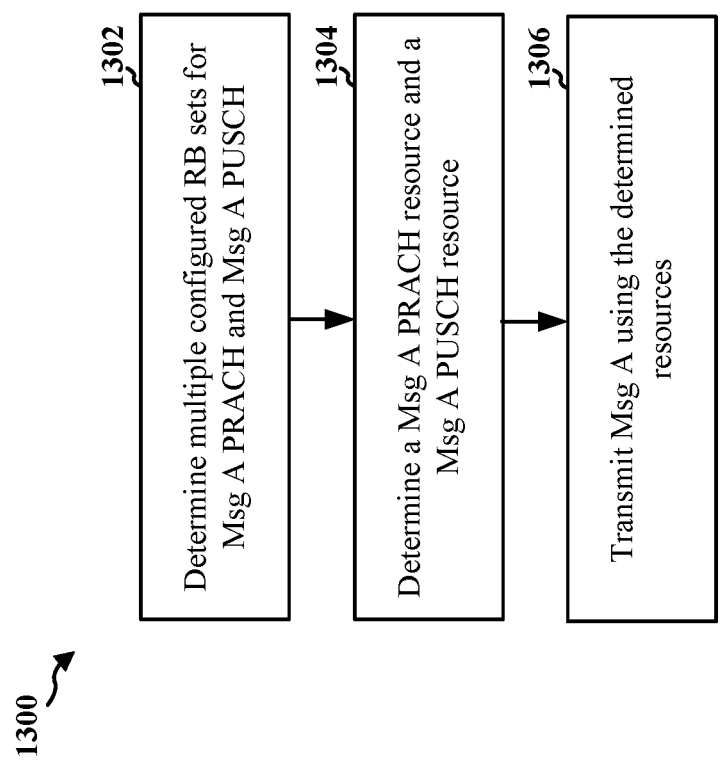
FIG. 13 is a flowchart of a method of wireless communication.

FIG. 13 is a flowchart 1300 of a method of wireless communication. The method may be performed by a UE (e.g., the UE 104, 350, 402, 504). In some aspects, the method may be performed by an apparatus 1402 in FIG. 14, the apparatus having memory and at least one processor configured to perform one or more aspects of the method of FIG. 13.

At 1302, the UE determines multiple configured RB sets for a PRACH and Msg A PUSCH. The determination may be performed, e.g., by the PRACH component 1442 of the apparatus 1402 in FIG. 14. FIG. 7 illustrates an example of a UE 702 receiving a configuration of one or more RB sets for PRACH and Msg A PUSCH, e.g., at 708.

At 1304, the UE determines a PRACH resource for a Msg A PRACH and a Msg A PUSCH, wherein for each PRACH slot, a number (N) of preambles are mapped to a valid PUSCH occasion with a DMRS sequence. The N PRACH sequences are counted first in a sequence domain in a RO, second in a frequency domain RO within an RB set, and third in a time domain within a PRACH slot. The valid PUSCH occasion and an associated DMRS sequence is mapped first in a frequency domain PO within an RB set, second to a DMRS sequence, third in a time domain PO within a slot, and fourth in the time domain PO over multiple slots. The mapping may include aspects described in connection with the example 850 in FIG. 8. The determination may be performed, e.g., by the PRACH component 1442 and/or the PUSCH component 1444 of the apparatus 1402 in FIG. 14. FIG. 7 illustrates an example of a UE 702 determining Msg A PRACH resources and Msg A PUSCH resources based on RB at 712 and 714, respectively.

At 1306, the UE transmits the Msg A, e.g., including the Msg A PRACH and the Msg A PUSCH. The transmission may be performed, e.g., by the PRACH component 1442 and/or the PUSCH component 1444 via the transmission component 1434 and/or the RF transceiver 1422 of the apparatus 1402 in FIG. 14.

For a non-interlaced PUSCH, a frequency start offset from the lowest RB of first PUSCH to PRB 0 is applied as a frequency start for the Msg A PUSCH in each RB set, e.g., as illustrated in FIG. 9A. For a non-interlaced PUSCH, the UE may further identify a frequency offset (first offset) between the first RB of the first PUSCH indicated by a frequency start offset and PRB 0, and identify second offset from the first RB of the first PUSCH and a lower end of the RB set in which the first PUSCH is positioned; apply the second frequency offset to the following RB sets, if the first RB set does hold all of the configured frequency domain PUSCH occasions; and within each RB set, fill in an integer number of POs, e.g., as described in connection with FIG. 9B.

For an interlaced PUSCH, an RB set start offset may be applied from the lowest RB set for the first PUSCH occasion which the Msg A PUSCH starts. For an interlaced PUSCH, a starting interlace index is applied to a starting interlace index over all of the multiple RB sets.

The UE may restrict the Msg A PUSCH to one RB set including restricting filling POs if a PO exceeds a number of interlaces available in an RB set.

Figure 14:
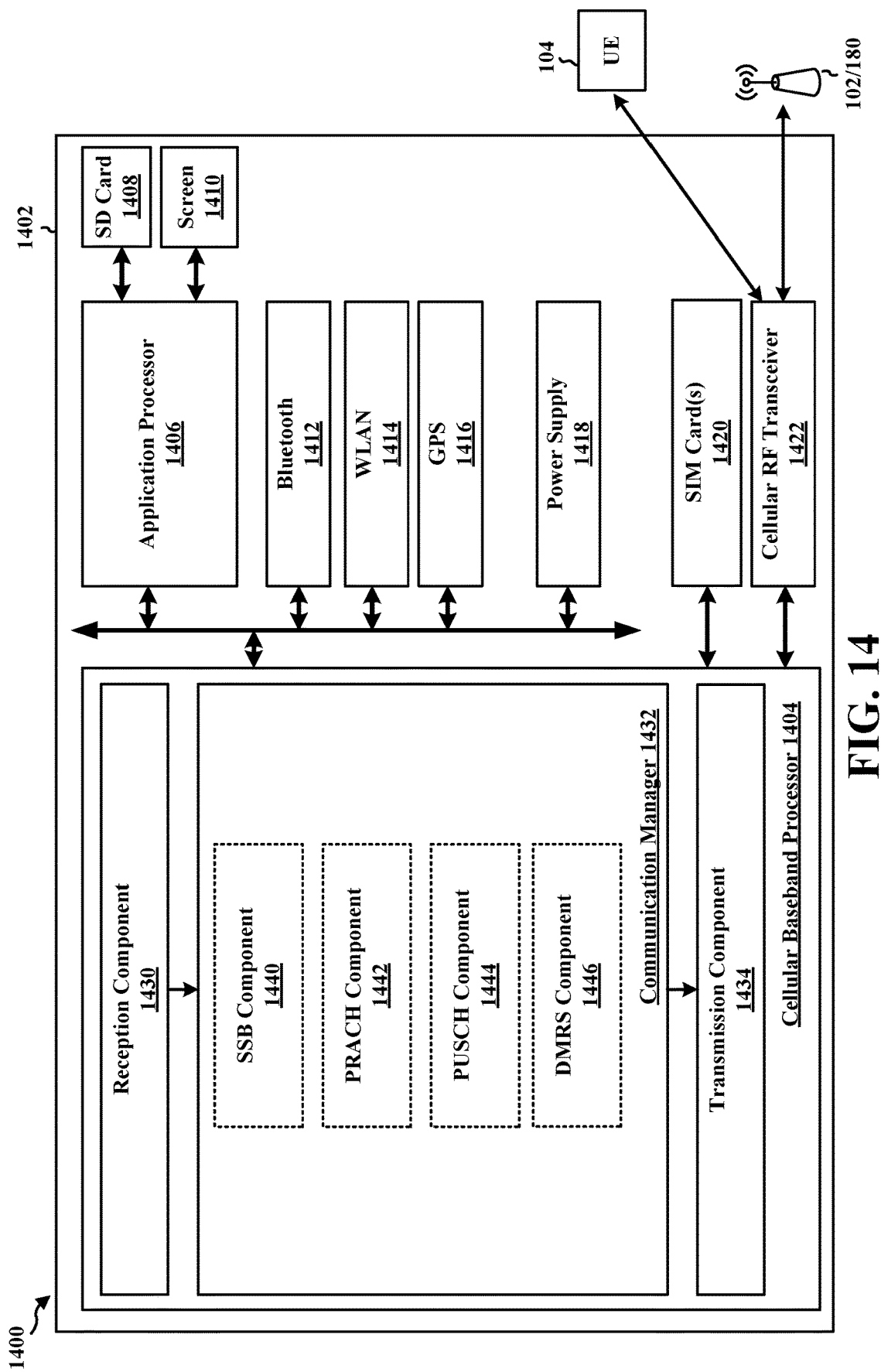
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes an SSB component 1440 that is configured to receive an SSB associated with an SSB index, e.g., as described in connection with 1102. The SSB component 1440 may be configured to determine the SSB index, such as described in connection with 1202. The communication manager 1432 further includes a PRACH component 1442 that is configured to transmit a random access message using the a PRACH resource based on an association pattern period for a single RB set of one or more RB sets, the SSB being mapped to a number (X) of preamble sequences that are allocated for SSBs first in a sequence domain within an RO, second in a frequency domain RO within the single RB set, third in a time domain RO within a PRACH slot, and fourth within a PRACH slot domain within a time period, e.g., as described in connection with 1108 and/or 1208. The communication manager 1432 further includes a PUSCH component 1444 that is configured to transmit a Msg A PUSCH based on a mapping to the Msg A PRACH, e.g., as described in connection with FIGS. 11 and/or 13. The communication manager 1432 further includes a DMRS component 1446 that is configured to transmit a DMRS, e.g., as described in connection with FIGS. 11 and/or 13.

The apparatus may include additional components that perform each of the blocks of the algorithm in the flowcharts of FIGS. 11-13, and/or any of the aspects performed by the UE 702 in FIG. 7. As such, each block in the flowcharts of FIGS. 11-13, and/or any of the aspects performed by the UE 702 in FIG. 7, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for receiving an SSB associated with an SSB index. The apparatus 1402 may further include means for transmitting a random access message using the a PRACH resource based on an association pattern period for a single RB set of one or more RB sets, the SSB being mapped to a number (X) of preamble sequences that are allocated for SSBs first in a sequence domain within a RO, second in a frequency domain RO within the single RB set, third in a time domain RO within a PRACH slot, and fourth within a PRACH slot domain within a time period. The apparatus 1402 may further include means for placing a PRACH within the single RB set is based on a frequency start offset from the lowest RE of the lowest PRACH to PRB 0 and a second frequency offset between the PRACH starting point indicated by the frequency start and a lower end of the single RB set in which the PRACH is positioned. The apparatus 1402 may further include means for transmitting a Msg A PUSCH mapped within the single RB set to the PRACH. The apparatus 1402 may further include means for mapping a PRACH resource for a Msg A PRACH and the Msg A PUSCH, wherein for each PRACH slot, a number (N) preambles are mapped to a valid PUSCH occasion with a DMRS sequence. The apparatus 1402 may further include means for mapping a PO and an associated DMRS sequence first in a frequency domain PO within the single RB set, second to a DMRS sequence, third in a time domain PO within a slot, and fourth in the time domain PO over multiple slots. The apparatus 1402 may further include means for transmitting and the DMRS associated with the Msg A PUSCH. The apparatus 1402 may further include means for identifying a first frequency offset between the first RB of the first PUSCH indicated by a frequency start offset and PRB 0, and identifying a second frequency offset from the first RB of the first PUSCH and a lower end of the RB set in which the first PUSCH is positioned. The apparatus 1402 may further include means for applying the second frequency offset to the following RB sets, if the first RB set does hold all of the configured frequency domain PUSCH occasions and within each RB set, filling in an integer number of POs. The apparatus 1402 may further include means for restricting the Msg A PUSCH to one RB set including restricting filling POs if a PO exceeds a number of interlaces available in an RB set. The means may be one or more of the components of the apparatus 1402 configured to perform the functions recited by the means. As described herein, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
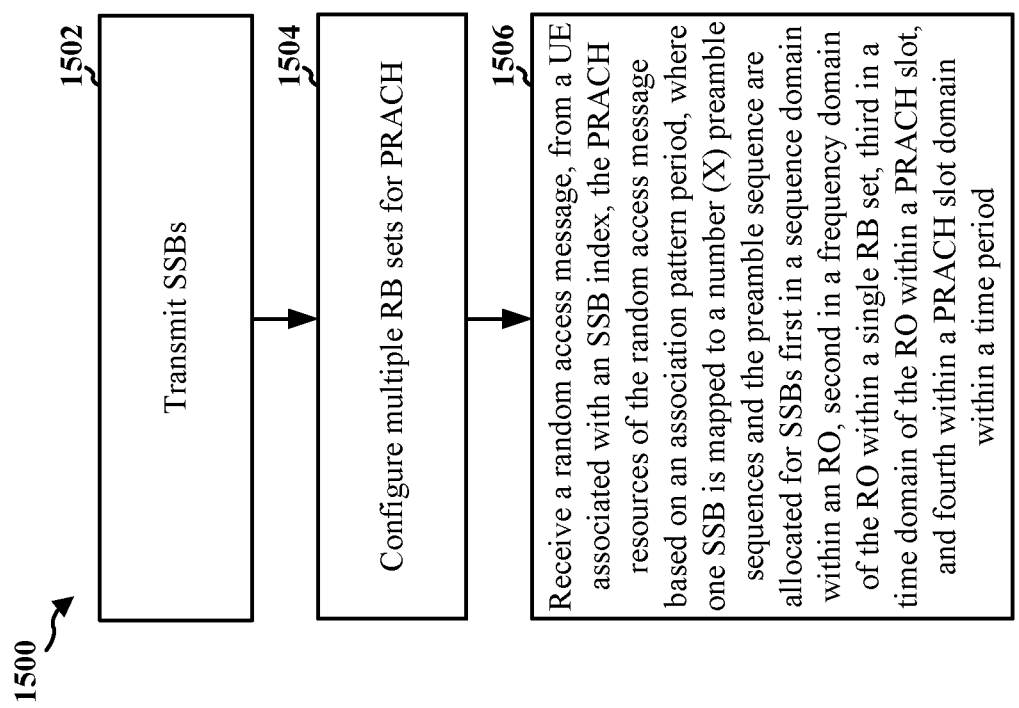
FIG. 15 is a flowchart of a method of wireless communication.

FIG. 15 is a flowchart 1500 of a method of wireless communication. The method may be performed by a base station (e.g., the base station 102, 180, 310, 402, 502, 704). In some aspects, the method may be performed by an apparatus 1802 in FIG. 18, the apparatus having memory and at least one processor configured to perform one or more aspects of the method of FIG. 15.

At 1502, the base station transmits an SSB over each of a plurality of beams, the SSB on each beam having a corresponding SSB index. FIG. 5 illustrates an example of a base station transmitting multiple SSBs over a plurality of beams. FIG. 7 illustrates an example of a base station transmitting an SSB. The transmission may be performed, e.g., by the SSB component 1840 via the transmission component 1834 and/or the RF transceiver 1822 of the apparatus 1802 in FIG. 18.

At 1504, the base station configures multiple RB sets for a PRACH. FIG. 7 illustrates an example of a base station configuring RB sets. The configuration may be performed, e.g., by the configuration component 1846 via the transmission component 1834 and/or the RF transceiver 1822 of the apparatus 1802 in FIG. 18.

At 1506, the base station receives a random access message, from a UE, associated with an SSB index, the PRACH resources of the random access message based on an association pattern period, where one SSB is mapped to a number (X) preamble sequences and the preamble sequence are allocated for SSBs an order first based on a sequence domain within a random access occasion (RO), second in a frequency domain of the RO within a single RB set, third in a time domain of one or more ROs within a PRACH slot, and fourth within a PRACH slot domain that is within a time period. The reception may be performed, e.g., by the PRACH component 1842 via the reception component 1830 and/or the RF transceiver 1822 of the apparatus 1802 in FIG. 18. FIG. 7 illustrates an example of a base station receiving a random access message associated with an SSB index.

A placement of a PRACH transmission within the single RB set is based on a frequency start offset from a lowest resource element (RE) of the PRACH resources to a physical resource block 0 (PRB 0) and a second frequency offset between a PRACH starting point indicated by the frequency start and a lower end of the single RB set in which the PRACH transmission is positioned. The UE may be in a connected mode with the base station, and the PRACH may be received on a shared spectrum. The single RB set may be one of multiple RB sets configured by the base station for the random access message on a PRACH.

The base station may further receive a Msg A PUSCH having resources associated with the Msg A PRACH, where for each PRACH slot, a number (N) preambles are mapped to a valid PUSCH occasion with a DMRS sequence. The reception of the Msg A PUSCH may be performed by the PUSCH component 1844 via the reception component 1830 and/or the RF transceiver 1822 of the apparatus 1802 in FIG. 18. The N PRACH sequences may be mapped based on a mapping order first in the sequence domain for the RO, second in the frequency domain for the RO within the single RB set, and third in a time domain within the PRACH slot. The valid PUSCH occasion and an associated DMRS sequence may be mapped to available PRACH resources based on a mapping order that is first in a frequency domain of a PUSCH occasion (PO) within the single RB set, second to the DMRS sequence, third in a time domain of the PO within a slot, and fourth in the time domain of one or more POs over multiple slots.

For a non-interlaced PUSCH, a frequency start offset from the lowest RB of a first PUSCH to PRB 0 may be applied as a frequency start for the Msg A PUSCH in the single RB set. For a non-interlaced PUSCH, the Msg A PUSCH may include a first frequency offset between the first RB of the first PUSCH indicated by a frequency start offset and PRB 0, and a second frequency offset from the first RB of the first PUSCH and a lower end frequency resource of the single RB set in which the first PUSCH is positioned.

For an interlaced PUSCH, an RB set start offset may be applied from the lowest indexed RB set for the first PUSCH occasion which the Msg A PUSCH starts. For an interlaced PUSCH, a starting interlace index may be applied to a starting interlace index over a combined set of multiple RB sets.

The Msg A PUSCH may be restricted to one RB set and mapping to POs is restricted if a particular PO exceeds a number of interlaces available in an RB set.

Figure 16:
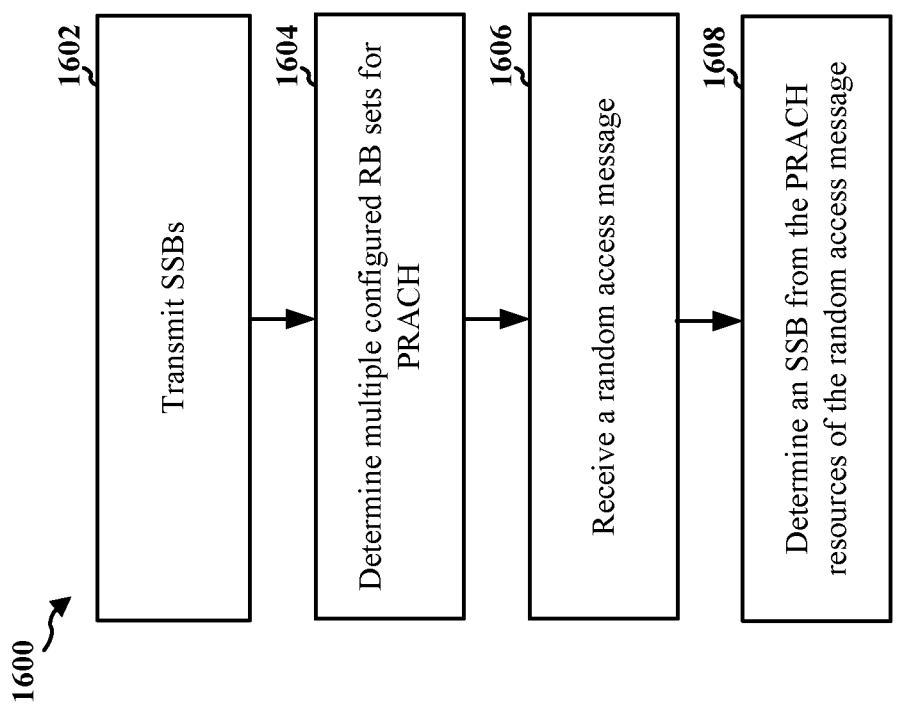
FIG. 16 is a flowchart of a method of wireless communication.

FIG. 16 is a flowchart 1600 of a method of wireless communication. The method may be performed by a base station (e.g., the base station 102, 180, 310, 402, 502, 704). In some aspects, the method may be performed by an apparatus 1802 in FIG. 18, the apparatus having memory and at least one processor configured to perform one or more aspects of the method of FIG. 16.

At 1602, the base station transmits an SSB over each of a plurality of beams, the SSB on each beam having a corresponding SSB index. FIG. 5 illustrates an example of a base station transmitting multiple SSBs over a plurality of beams. FIG. 7 illustrates an example of a base station transmitting an SSB. The transmission may be performed, e.g., by the SSB component 1840 via the transmission component 1834 and/or the RF transceiver 1822 of the apparatus 1802 in FIG. 18.

At 1604, the base station determines multiple configured RB sets for a PRACH. FIG. 7 illustrates an example of a base station configuring RB sets. The configuration may be performed, e.g., by the configuration component 1846 via the transmission component 1834 and/or the RF transceiver 1822 of the apparatus 1802 in FIG. 18.

At 1606, the base station receives a random access message from a UE. The reception may be performed, e.g., by the PRACH component 1842 via the reception component 1830 and/or the RF transceiver 1822 of the apparatus 1802 in FIG. 18. FIG. 7 illustrates an example of a base station receiving a random access message associated with an SSB index.

At 1608, the base station determines an SSB index associated with the random access message from the PRACH resources of the random access message based on an association pattern period, for each RB set where one SSB is mapped to a number (X) preamble sequences and the preamble sequence are allocated for SSBs first in a sequence domain within a RO, second in a frequency domain RO within an RB set, third in a time domain RO within a PRACH slot, and fourth within a PRACH slot domain within a time period. A placement of a PRACH within an RB set may be based on a frequency start offset from the lowest RE of the lowest PRACH to PRB 0 and a second frequency offset between the PRACH starting point indicated by the frequency start and a lower end of a first RB set in which the PRACH is positioned. The base station may use the determined SSB index to determine a beam for communicating with the UE, for example. The determination may be performed, e.g., by the PRACH component 1842 of the apparatus 1802 in FIG. 18.

Figure 17:
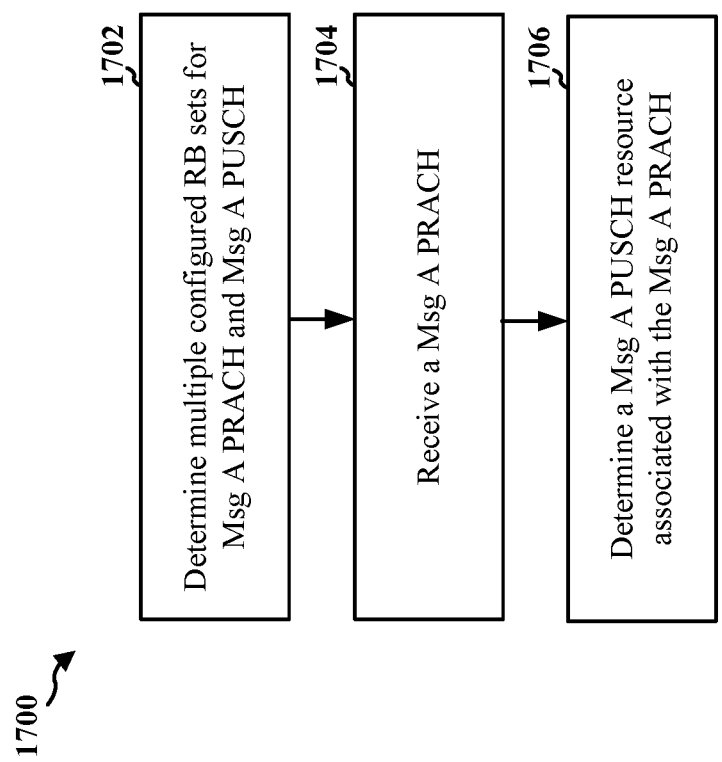
FIG. 17 is a flowchart of a method of wireless communication.

FIG. 17 is a flowchart 1700 of a method of wireless communication. The method may be performed by a base station (e.g., the base station 102, 180, 310, 402, 502, 704). In some aspects, the method may be performed by an apparatus 1802 in FIG. 18, the apparatus having memory and at least one processor configured to perform one or more aspects of the method of FIG. 17.

At 1702, the base station determines multiple configured RB sets for a PRACH and Msg A PUSCH. FIG. 7 illustrates an example of a base station configuring RB sets. The configuration may be performed, e.g., by the configuration component 1846 via the transmission component 1834 and/or the RF transceiver 1822 of the apparatus 1802 in FIG. 18.

At 1704, the base station receives a random access message from a UE including a Msg A PRACH. The reception may be performed, e.g., by the PRACH component 1842 via the reception component 1830 and/or the RF transceiver 1822 of the apparatus 1802 in FIG. 18. FIG. 7 illustrates an example of a base station receiving a random access message associated with an SSB index.

At 1706, the base station determines Msg A resources associated with the Msg A PRACH, wherein for each PRACH slot, a number (N) preambles are mapped to a valid PUSCH occasion with a DMRS sequence. The N PRACH sequences are counted first in a sequence domain in a RO, second in a frequency domain RO within an RB set, and third in a time domain within a PRACH slot. The valid PUSCH occasion and an associated DMRS sequence is mapped first in a frequency domain PO within an RB set, second to a DMRS sequence, third in a time domain PO within a slot, and fourth in the time domain PO over multiple slots. The determination may be performed, e.g., by the PUSCH component 1844 of the apparatus 1802 in FIG. 18.

For a non-interlaced PUSCH, a frequency start offset from the lowest RB of first PUSCH to PRB 0 is applied as a frequency start for the Msg A PUSCH in each RB set, e.g., as illustrated in FIG. 9A. For a non-interlaced PUSCH, the UE may further identify a frequency offset (first offset) between the first RB of the first PUSCH indicated by a frequency start offset and PRB 0, and identify second offset from the first RB of the first PUSCH and a lower end of the RB set in which the first PUSCH is positioned; apply the second frequency offset to the following RB sets, if the first RB set does hold all of the configured frequency domain PUSCH occasions; and within each RB set, fill in an integer number of POs, e.g., as described in connection with FIG. 9B

For an interlaced PUSCH, an RB set start offset may be applied from the lowest RB set for the first PUSCH occasion which the Msg A PUSCH starts. For an interlaced PUSCH, a starting interlace index is applied to a starting interlace index over all of the multiple RB sets.

The Msg A PUSCH may be restricted to one RB set including restricting filling POs if a PO exceeds a number of interlaces available in an RB set.

Figure 18:
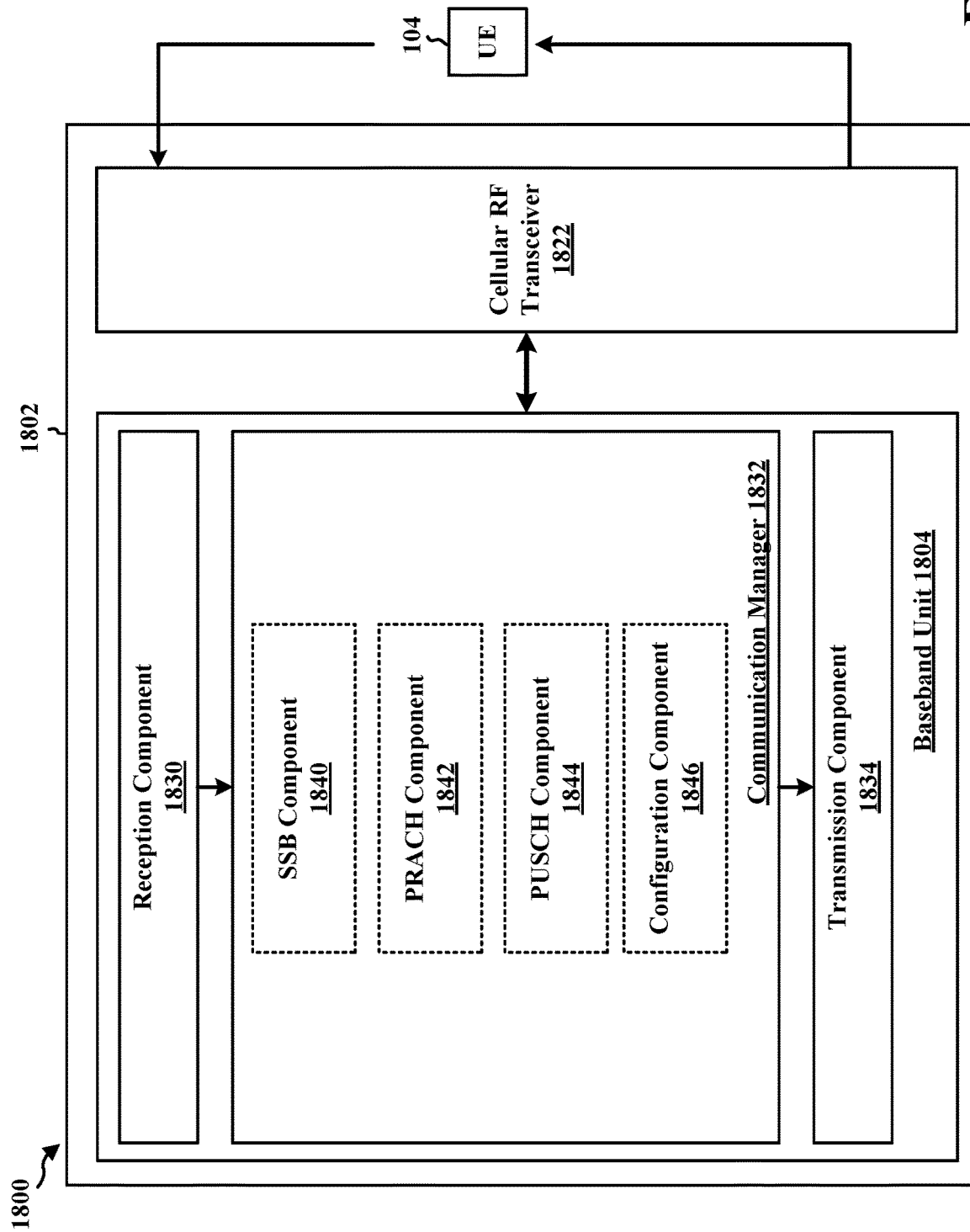
FIG. 18 is a diagram illustrating an example of a hardware implementation for an example apparatus.

FIG. 18 is a diagram 1800 illustrating an example of a hardware implementation for an apparatus 1802. The apparatus 1802 may be a base station, a component of a base station, or may implement base station functionality. In some aspects, the apparatus 1802 may include a baseband unit 1804. The baseband unit 1804 may communicate through an RF transceiver 1822 with the UE 104. The baseband unit 1804 may include a computer-readable medium/memory. The baseband unit 1804 is responsible for general processing, including the execution of software stored on the computer-readable medium/memory. The software, when executed by the baseband unit 1804, causes the baseband unit 1804 to perform the various functions described supra. The computer-readable medium/memory may also be used for storing data that is manipulated by the baseband unit 1804 when executing software. The baseband unit 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband unit 1804. The baseband unit 1804 may be a component of the base station 310 and may include the memory 376 and/or at least one of the TX processor 316, the RX processor 370, and the controller/processor 375.

The communication manager 1832 includes an SSB component 1840 that transmits an SSB over each of a plurality of beams, the SSB on each beam having a corresponding SSB index, e.g., as described in connection with 1502 in FIG. 15. The communication manager 1832 further includes a PRACH component 1842 that is configured to receive a random access message, from a UE associated with an SSB index, the PRACH resources of the random access message based on an association pattern period, where one SSB is mapped to a number (X) preamble sequences and the preamble sequence are allocated for SSBs first in a sequence domain within a RO, second in a frequency domain RO within a single RB set, third in a time domain RO within a PRACH slot, and fourth within a PRACH slot domain within a time period, e.g., as described in connection with 1506 in FIG. 15. The communication manager 1832 further includes a PUSCH component 1844 that is configured to receive a Msg A PUSCH having resources associated with the Msg A PRACH, where for each PRACH slot, a number (N) preambles are mapped to a valid PUSCH occasion with a DMRS sequence, e.g., as described in connection with the method of FIG. 15. The communication manager 1832 further includes a configuration component 1846 that configures multiple RB sets for a PRACH. FIG. 7 illustrates an example of a base station configuring RB sets, e.g., as described in connection with 1504 in FIG. 15.

The apparatus may include additional components that perform each of the blocks of the algorithm in the flowcharts of FIGS. 15, 16, and/or 17, and/or the aspects performed by the base station 704 in FIG. 7. As such, each block in the flowcharts of FIGS. 15, 16, and/or 17, and/or the aspects performed by the base station 704 in FIG. 7, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband unit 1804, includes means for transmitting an SSB over each of a plurality of beams, the SSB on each beam having a corresponding SSB index. The apparatus 1802 includes means for configuring multiple RB sets for a PRACH and means for receiving a random access message, from a UE associated with an SSB index, the PRACH resources of the random access message based on an association pattern period, where one SSB is mapped to a number (X) preamble sequences and the preamble sequence are allocated for SSBs first in a sequence domain within a RO, second in a frequency domain RO within a single RB set, third in a time domain RO within a PRACH slot, and fourth within a PRACH slot domain within a time period. The apparatus 1802 may further include means for receiving a Msg A PUSCH having resources associated with the Msg A PRACH, wherein for each PRACH slot, a number (N) preambles are mapped to a valid PUSCH occasion with a DMRS sequence, where the N PRACH sequences are counted first in a sequence domain in a RO, second in a frequency domain RO within the single RB set, and third in a time domain within a PRACH slot, and where the valid PUSCH occasion and an associated DMRS sequence is mapped first in a frequency domain PO within the single RB set, second to a DMRS sequence, third in a time domain PO within a slot, and fourth in the time domain PO over multiple slots. The means may be one or more of the components of the apparatus 1802 configured to perform the functions recited by the means. As described supra, the apparatus 1802 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: receiving a SSB having an SSB index; and transmitting a random access message using a PRACH resource based on an association pattern period for a single RB set of one or more RB sets, the SSB being mapped to a number (X) of preamble sequences that are allocated for SSBs in an order first based on a sequence domain within a RO, second in a frequency domain of the RO within the single RB set, third in a time domain of one or more ROs within a PRACH slot, and fourth within a PRACH slot domain that is within a time period.

In aspect 2, the method of aspect 1 further includes that a placement of a PRACH transmission within the single RB set is based on a frequency start offset from a lowest RE of the available PRACH resources to a physical resource block 0 (PRB 0) and a second frequency offset between a PRACH starting point indicated by the frequency start and a lower end of the single RB set in which the PRACH transmission is positioned.

In aspect 3, the method of aspect 1 or aspect 2 further includes that the UE is in a connected mode with a base station from which the SSB is received, and a PRACH transmission is over a shared spectrum.

In aspect 4, the method of any of aspects 1-3 further includes that the single RB set is one of multiple RB sets configured, by a base station from which the SSB is received, for transmission of the random access message on a PRACH.

In aspect 4, the method of any of aspects 1-4 further includes transmitting a Msg A PUSCH mapped within the single RB set to the PRACH resource of the random access message.

In aspect 6, the method of aspect 5 further includes mapping a PRACH resource for a Msg A PRACH and the Msg A PUSCH, wherein for each PRACH slot, a number (N) preambles are mapped to a valid PUSCH occasion with a DMRS sequence, wherein the N PRACH sequences are mapped based on a mapping order first in the sequence domain for the RO, second in the frequency domain for the RO within the single RB set, and third in a time domain within the PRACH slot.

In aspect 7, the method of aspect 6 further includes mapping a PO and an associated DMRS sequence to available PRACH resources, based on a mapping order that is first in a frequency domain of the PO within the single RB set, second to the DMRS sequence, third in a time domain of the PO within a slot, and fourth in the time domain of one or more POs over multiple slots; and transmitting the DMRS associated with the Msg A PUSCH.

In aspect 8, the method of aspect 7 further includes that for a non-interlaced PUSCH, a frequency start offset from a lowest RB of first PUSCH to PRB 0 is applied as the frequency start for the Msg A PUSCH in the single RB set.

In aspect 9, the method of aspect 7 further includes that for a non-interlaced PUSCH, the method further comprising: identifying a first frequency offset between a first RB of a first PUSCH indicated based on a frequency start offset and a PRB 0, and identify a second frequency offset from the first RB of the first PUSCH and a lower end frequency resource of a first RB set in which the first PUSCH is positioned; applying the second frequency offset to one or more additional RB sets, if the first RB set comprises each configured frequency domain PUSCH occasion; and within each RB set, filling in an integer number of POs.

In aspect 10, the method of aspect 7 further includes that for an interlaced PUSCH, an RB set start offset is applied from a lowest indexed RB set for a first PUSCH occasion in which the Msg A PUSCH starts.

In aspect 11, the method of aspect 7 further includes that wherein for an interlaced PUSCH, a starting interlace index is applied to the starting interlace index over a combined set of multiple RB sets.

In aspect 12, the method of any of aspects 7, 10 or 11 further includes that restricting the Msg A PUSCH to one RB set including restricting mapping to POs if a particular PO exceeds a number of interlaces available in an RB set.

Aspect 13 is an apparatus for wireless communication at a UE comprising means to perform the method of any of aspects 1-12.

In aspect 14, the apparatus of aspect 13 further includes at least one antenna and a transceiver coupled to the at least one antenna.

Aspect 15 is an apparatus for wireless communication at a UE comprising a memory and at least one processor coupled to the memory, the memory and the at least one processor configured to perform the method of any of aspects 1-12.

In aspect 16, the apparatus of aspect 15 further includes at least one antenna and a transceiver coupled to the at least one antenna and the at least one processor.

Aspect 17 is a non-transitory computer-readable medium storing computer executable code for wireless communication at a UE, where the code when executed by a processor causes the processor to implement the method of any of aspects 1-12.

Aspect 18 is a method of wireless communication at a base station, comprising: transmitting an SSB over each of a plurality of beams, the SSB on each beam having a corresponding SSB index; configuring multiple RB sets for a PRACH; receiving a random access message, from a UE associated with an SSB index, the PRACH resources of the random access message based on an association pattern period, where one SSB is mapped to a number (X) of preamble sequences that are allocated for SSBs first in an order first based on a sequence domain within a RO, second in a frequency domain of the RO within a single RB set, third in a time domain of one or more ROs within a PRACH slot, and fourth within a PRACH slot domain that is within a time period.

In aspect 19, the method of aspect 18 further includes that a placement of a PRACH transmission within the single RB set is based on a frequency start offset from a lowest RE of the available PRACH resources to a PRB 0 and a second frequency offset between a PRACH starting point indicated by the frequency start and a lower end of the single RB set in which the PRACH transmission is positioned.

In aspect 20, the method of aspect 18 or aspect 19 further includes that the UE is in a connected mode with the base station, and the PRACH is received on a shared spectrum.

In aspect 21, the method of any of aspects 18-20 further includes that the single RB set is one of multiple RB sets configured by the base station for the random access message on a PRACH.

In aspect 22, the method of any of aspects 18-21 further includes receiving a Msg A PUSCH having resources associated with a Msg A PRACH, wherein for each PRACH slot, a number (N) preambles are mapped to a valid PUSCH occasion with a DMRS sequence, wherein N PRACH sequences are mapped based on a mapping order first in the sequence domain for the RO, second in the frequency domain for the RO within the single RB set, and third in a time domain within the PRACH slot, and wherein the valid PUSCH occasion and an associated DMRS sequence is mapped to available PRACH resources based on a mapping order that is first in a frequency domain of a PO within the single RB set, second to the DMRS sequence, third in a time domain of the PO within a slot, and fourth in the time domain of one or more POs over multiple slots.

In aspect 23, the method of aspect 22 further includes that for a non-interlaced PUSCH, a frequency start offset from a lowest RB of a first PUSCH to PRB 0 is applied as the frequency start for the Msg A PUSCH in the single RB set.

In aspect 24, the method of aspect 22 further includes that for a non-interlaced PUSCH, the Msg A PUSCH includes a first frequency offset between the first RB of the first PUSCH indicated by a frequency start offset and PRB 0, and a second frequency offset from the first RB of the first PUSCH and a lower end frequency resource of the single RB set in which the first PUSCH is positioned.

In aspect 25, the method of aspect 22 further includes that for an interlaced PUSCH, an RB set start offset is applied from a lowest indexed RB set for the first PUSCH occasion which the Msg A PUSCH starts In aspect 26, the method of aspect 22 further includes that for an interlaced PUSCH, a starting interlace index is applied to the starting interlace index a combined set of multiple RB sets.

In aspect 27, the method of any of aspects 22, 25, or 26 further includes that the Msg A PUSCH is restricted to one RB set and mapping to POs is restricted if a particular PO exceeds a number of interlaces available in an RB set.

Aspect 28 is an apparatus for wireless communication at a UE comprising means to perform the method of any of aspects 18-27.

In aspect 29, the apparatus of aspect 28 further includes at least one antenna and a transceiver coupled to the at least one antenna.

Aspect 30 is an apparatus for wireless communication at a UE comprising a memory and at least one processor coupled to the memory, the memory and the at least one processor configured to perform the method of any of aspects 18-27.

In aspect 31, the apparatus of aspect 30 further includes at least one antenna and a transceiver coupled to the at least one antenna and the at least one processor.

Aspect 32 is a non-transitory computer-readable medium storing computer executable code for wireless communication at a UE, where the code when executed by a processor causes the processor to implement the method of any of aspects 18-27.

What is claimed is:

1. An apparatus for wireless communication at a user equipment (UE), comprising:
  memory; and
  at least one processor coupled to the memory and configured to:
    receive a configuration for multiple resource block (RB) sets, wherein the UE has an active uplink bandwidth part (BWP) that is wider than a single RB set of the multiple RB sets, and wherein an RB set includes frequency resources available to the UE for random access transmissions in random access occasions (ROs);
    receive a synchronization signal block (SSB) having an SSB index; and
    transmit a random access message on a shared spectrum using a physical random access channel (PRACH) resource based on an association pattern period for the single RB set of the multiple RB sets, the SSB being mapped to a number (X) of preamble sequences that are allocated for SSBs in an order first based on a sequence domain within an RO, second in a frequency domain of the RO within the single RB set of the multiple RB sets, third in a time domain of one or more ROs within a PRACH slot, and fourth within a PRACH slot domain that is within a time period.

2. The apparatus of claim 1, wherein a placement of a PRACH transmission within the single RB set is based on a frequency start offset from a lowest resource element (RE) of available PRACH resources to a physical resource block 0 (PRB 0) and a second frequency offset between a PRACH starting point indicated by the frequency start offset and a lower end of the single RB set in which the PRACH transmission is positioned.

3. The apparatus of claim 1, wherein the UE is in a connected mode with a base station from which the SSB is received.

4. The apparatus of claim 1, wherein the single RB set is one of the multiple RB sets configured, by a base station from which the SSB is received, for transmission of the random access message on a PRACH.

5. The apparatus of claim 1, wherein the at least one processor is further configured to:
  transmit a Msg A physical uplink shared channel (PUSCH) mapped within the single RB set to the PRACH resource of the random access message.

6. The apparatus of claim 5, wherein the at least one processor is further configured to:
  map the PRACH resource for a Msg A PRACH and the Msg A PUSCH, wherein for each PRACH slot, a number (N) preambles are mapped to a valid PUSCH occasion (PO) with a demodulation reference signal (DMRS) sequence,
  wherein N PRACH sequences are mapped based on a mapping order first in the sequence domain for the RO, second in the frequency domain for the RO within the single RB set, and third in the time domain within the PRACH slot.

7. The apparatus of claim 6, wherein the at least one processor is further configured to:
  map the valid PO and the DMRS sequence to available PRACH resources, based on a PO mapping order that is first in the frequency domain of the PO within the single RB set, second to the DMRS sequence, third in the time domain of the PO within a slot, and fourth in the time domain of one or more POs over multiple slots; and
  transmit the Msg A PUSCH and the DMRS associated with the Msg A PUSCH.

8. The apparatus of claim 7, wherein for a non-interlaced PUSCH, the memory and the at least one processor are configured to apply a frequency start offset from a lowest RB of a first PUSCH to a physical resource block 0 (PRB 0) as a frequency start for the Msg A PUSCH in the single RB set.

9. The apparatus of claim 7, wherein for a non-interlaced PUSCH, the at least one processor is further configured to:
  identify a first frequency offset between a first RB of a first PUSCH indicated based on a frequency start offset and a physical resource block 0 (PRB 0), and identify a second frequency offset from the first RB of the first PUSCH and a lower end frequency resource of the first RB set in which the first PUSCH is positioned;
  apply the second frequency offset to one or more additional RB sets, if the first RB set comprises each configured frequency domain PUSCH occasion; and
  within each RB set, fill in an integer number of POs.

10. The apparatus of claim 7, wherein for an interlaced PUSCH, the at least one processor is configured to apply an RB set start offset from a lowest indexed RB set for a first PUSCH occasion in which the Msg A PUSCH starts.

11. The apparatus of claim 7, wherein for an interlaced PUSCH, the at least one processor is configured to apply a starting interlace index to the starting interlace index over a combined set of the multiple RB sets.

12. The apparatus of claim 7, wherein the at least one processor is further configured to:
  restrict the Msg A PUSCH to the single RB set and restrict mapping to POs if a particular PO exceeds a number of interlaces available in the single RB set.

13. The apparatus of claim 1, further comprising:
  at least one antenna; and
  a transceiver coupled to the at least one antenna and the at least one processor.

14. A method of wireless communication at a user equipment (UE), comprising:
  receiving a configuration for multiple resource block (RB) sets, wherein the UE has an active uplink bandwidth part (BWP) that is wider than a single RB set of the multiple RB sets, and wherein an RB set includes frequency resources available to the UE for random access transmissions in random access occasions (ROs);
  receiving a synchronization signal block (SSB) having an SSB index; and
  transmitting a random access message on a shared spectrum using a physical random access channel (PRACH) resource based on an association pattern period for the single RB set of the multiple RB sets, the SSB being mapped to a number (X) of preamble sequences that are allocated for SSBs in an order first based on a sequence domain within an RO, second in a frequency domain of the RO within the single RB set of the multiple RB sets, third in a time domain of one or more ROs within a PRACH slot, and fourth within a PRACH slot domain that is within a time period.

15. The method of claim 14, wherein a placement of a PRACH transmission within the single RB set is based on a frequency start offset from a lowest resource element (RE) of available PRACH resources to a physical resource block 0 (PRB 0) and a second frequency offset between a PRACH starting point indicated by the frequency start offset and a lower end of the single RB set in which the PRACH transmission is positioned.

16. The method of claim 14, wherein the UE is in a connected mode with a base station from which the SSB.

17. The method of claim 14, wherein the single RB set is one of the multiple RB sets configured, by a base station from which the SSB is received, for transmission of the random access message on a PRACH.

18. The method of claim 14, further comprising:
transmitting a Msg A physical uplink shared channel (PUSCH) mapped within the single RB set to the PRACH resource of the random access message.

19. An apparatus for wireless communication at a base station, comprising:
memory; and
at least one processor coupled to the memory and configured to:
transmit a synchronization signal block (SSB) over each of a plurality of beams, the SSB on each beam having a corresponding SSB index;
configure multiple resource block (RB) sets for a physical random access channel (PRACH); and
receive a random access message on a shared spectrum, from a user equipment (UE) associated with an SSB index, wherein an active uplink bandwidth part (BWP) for the UE is wider than a single RB set of the multiple RB sets, wherein an RB set includes frequency resources available to the UE for random access transmissions in random access occasions (ROs), and wherein the PRACH resource of the random access message is based on an association pattern period, where one SSB is mapped to a number (X) of preamble sequences that are allocated for SSBs first in an order first based on a sequence domain within an RO, second in a frequency domain of the RO within the single RB set of the multiple RB sets, third in a time domain of one or more ROs within a PRACH slot, and fourth within a PRACH slot domain that is within a time period.

20. The apparatus of claim 19, wherein a placement of a PRACH transmission within the single RB set is based on a frequency start offset from a lowest resource element (RE) of available PRACH resources to a physical resource block 0 (PRB 0) and a second frequency offset between a PRACH starting point indicated by the frequency start offset and a lower end of the single RB set in which the PRACH transmission is positioned.

21. The apparatus of claim 19, wherein the base station is in a connected mode with the UE.

22. The apparatus of claim 19, wherein the single RB set is one of the multiple RB sets configured by the base station for the random access message on the PRACH.

23. The apparatus of claim 19, wherein the at least one processor is further configured to:
receive a Msg A physical uplink shared channel (PUSCH) having resources associated with a Msg A PRACH, wherein for the PRACH slot, a number (N) preambles are mapped to a valid PUSCH occasion with a demodulation reference signal (DMRS) sequence,
wherein N PRACH sequences are mapped based on a mapping order first in the sequence domain for the RO, second in the frequency domain for the RO within the single RB set, and third in the time domain within the PRACH slot, and
wherein the valid PUSCH occasion and the DMRS sequence are mapped to available PRACH resources based on a PUSCH occasion (PO) mapping order that is first in the frequency domain of a PO within the single RB set, second to the DMRS sequence, third in the time domain of the PO within a slot, and fourth in the time domain of one or more POs over multiple slots.

24. The apparatus of claim 23, wherein for a non-interlaced PUSCH, the memory and the at least one processor are configured to apply a frequency start offset from a lowest RB of a first PUSCH to a physical resource block 0 (PRB 0) as a frequency start for the Msg A PUSCH in the single RB set.

25. The apparatus of claim 23, wherein for a non-interlaced PUSCH, the Msg A PUSCH includes a first frequency offset between a first RB of a first PUSCH indicated by a frequency start offset and a physical resource block 0 (PRB 0), and a second frequency offset from the first RB of the first PUSCH and a lower end frequency resource of the single RB set in which the first PUSCH is positioned.

26. The apparatus of claim 23, wherein for an interlaced PUSCH, the at least one processor is configured to apply an RB set start offset from a lowest indexed RB set for a first PUSCH occasion which the Msg A PUSCH starts.

27. The apparatus of claim 23, wherein for an interlaced PUSCH, the at least one processor is further configured to apply a starting interlace index to the starting interlace index over a combined set of multiple RB sets.

28. The apparatus of claim 23, wherein the Msg A PUSCH is restricted to the single RB set and mapping to POs is restricted if a particular PO exceeds a number of interlaces available in the single RB set.

29. The apparatus of claim 19, further comprising:
at least one antenna; and
a transceiver coupled to the at least one antenna and the at least one processor.

30. A method of wireless communication at a base station, comprising:
transmitting a synchronization signal block (SSB) over each of a plurality of beams, the SSB on each beam having a corresponding SSB index;
configuring multiple resource block (RB) sets for a physical random access channel (PRACH); and
receiving a random access message on a shared spectrum, from a UE associated with an SSB index, wherein an active uplink bandwidth part (BWP) for the UE is wider than a single RB set of the multiple RB sets, wherein an RB set includes frequency resources available to the UE for random access transmissions in random access occasions (ROs), and wherein the PRACH resource of the random access message based on an association pattern period, where one SSB is mapped to a number (X) of preamble sequences that are allocated for SSBs first in an order first based on a sequence domain within an RO, second in a frequency domain of the RO within the single RB set of the multiple RB sets, third in a time domain of one or more ROs within a PRACH slot, and fourth within a PRACH slot domain that is within a time period.

* * * * *